(12) United States Patent
Kawashima et al.

(10) Patent No.: US 11,962,204 B2
(45) Date of Patent: Apr. 16, 2024

(54) ROTOR MANUFACTURING METHOD AND ROTOR MANUFACTURING APPARATUS

(71) Applicant: AISIN CORPORATION, Aichi (JP)

(72) Inventors: Takaaki Kawashima, Kariya (JP); Yutaka Hara, Kariya (JP); Mariko Saito, Kariya (JP)

(73) Assignee: AISIN CORPORATION, Kariya (JP)

( * ) Notice: Subject to any disclaimer, the term of this patent is extended or adjusted under 35 U.S.C. 154(b) by 35 days.

(21) Appl. No.: 17/602,295

(22) PCT Filed: May 21, 2020

(86) PCT No.: PCT/JP2020/020180
§ 371 (c)(1),
(2) Date: Oct. 8, 2021

(87) PCT Pub. No.: WO2020/255618
PCT Pub. Date: Dec. 24, 2020

(65) Prior Publication Data
US 2022/0166294 A1 May 26, 2022

(30) Foreign Application Priority Data
Jun. 20, 2019 (JP) .................................. 2019-114521

(51) Int. Cl.
H02K 15/02 (2006.01)
B23P 19/02 (2006.01)
(52) U.S. Cl.
CPC .............. H02K 15/02 (2013.01); B23P 19/02 (2013.01)

(58) Field of Classification Search
CPC .......... B23P 19/02; H02K 1/28; H02K 15/02; H02K 15/028
See application file for complete search history.

(56) References Cited

U.S. PATENT DOCUMENTS

| | | | |
|---|---|---|---|
| 2014/0097711 A1 | 4/2014 | Kubes | |
| 2014/0326090 A1 | 11/2014 | Kisa et al. | |
| 2015/0171675 A1* | 6/2015 | Carrasco | H02K 1/30 29/596 |
| 2022/0166294 A1* | 5/2022 | Kawashima | H02K 15/02 |

FOREIGN PATENT DOCUMENTS

| | | |
|---|---|---|
| DE | 10 2016 215090 A1 | 2/2018 |
| JP | S53-149608 A | 12/1978 |
| JP | 2001-268858 A | 9/2001 |
| JP | 2014-529508 A | 11/2014 |
| JP | 2017-041991 A | 2/2017 |
| WO | WO-2010054997 A1 * 5/2010 ........... B21D 26/051 |

OTHER PUBLICATIONS

Jul. 14, 2020 International Search Report issued in International Patent Application No. PCT/JP2020/020180.
Jul. 15, 2022 extended Search Report issued in European Patent Application No. 20825668.5.

* cited by examiner

Primary Examiner — Minh N Trinh
(74) Attorney, Agent, or Firm — Oliff PLC

(57) ABSTRACT

This rotor manufacturing method includes the steps of: pressing a rotor core in a central axis direction by using a core pressing member; and fixing a shaft to the rotor core by performing, with the rotor core pressed, hydroforming that involves pressure-welding the shaft to an inner peripheral surface of a shaft insertion hole.

12 Claims, 19 Drawing Sheets

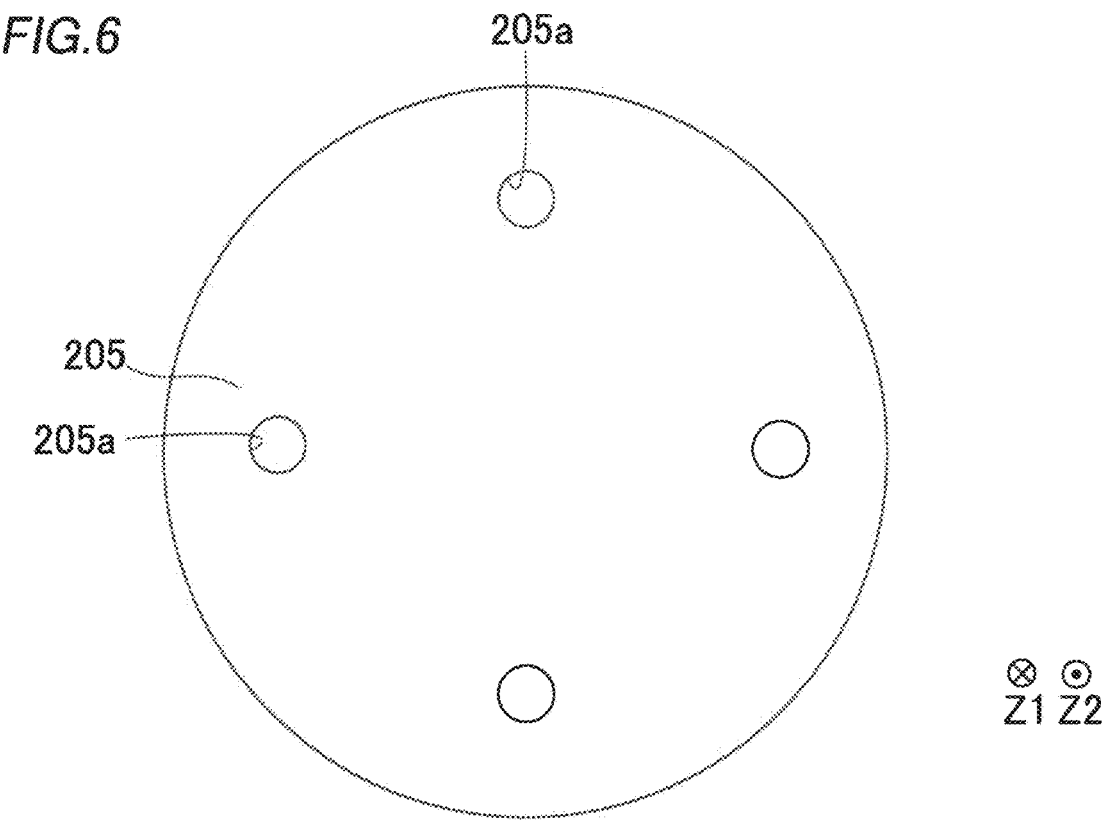
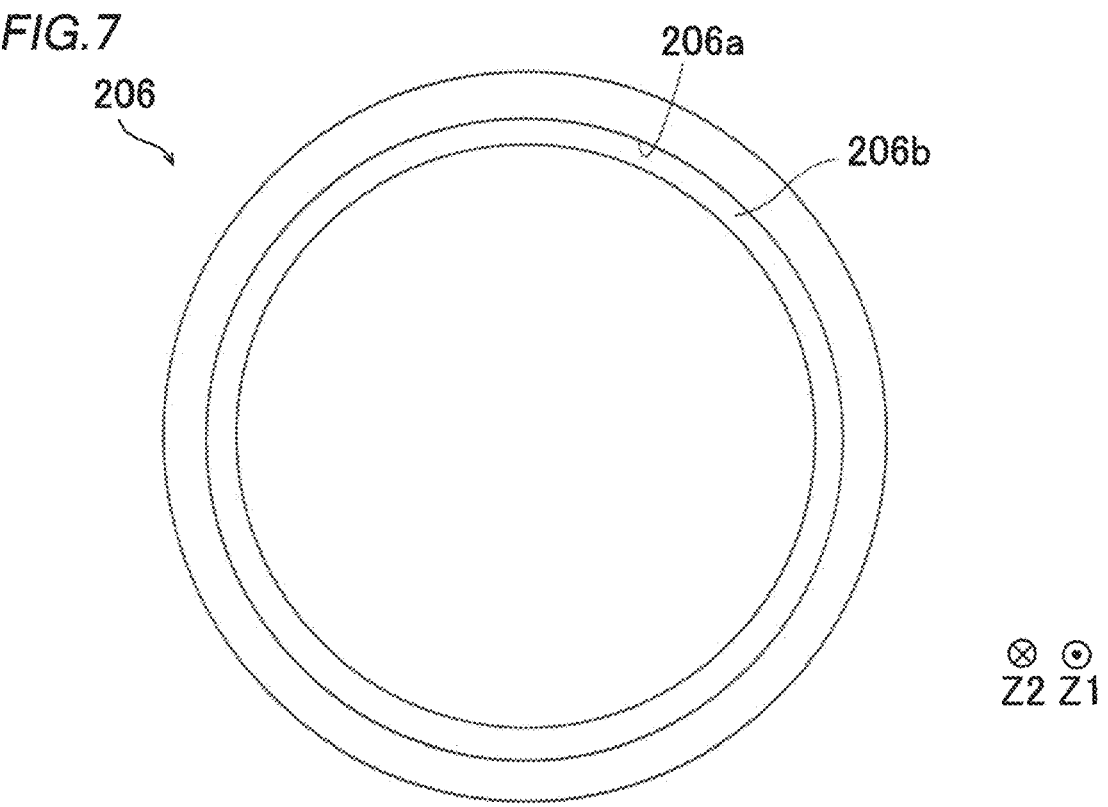

ROTOR MANUFACTURING METHOD AND ROTOR MANUFACTURING APPARATUS

TECHNICAL FIELD

The present disclosure relates to rotor manufacturing methods and rotor manufacturing apparatuses.

BACKGROUND ART

A method for manufacturing a rotor including a rotor core fixed to a shaft by hydroforming and an apparatus for manufacturing such a rotor are known in the related art. Such rotor manufacturing method and rotor manufacturing apparatus are disclosed in, for example, Japanese Unexamined Patent Application Publication No. 2001-268858 (JP 2001-268858 A).

JP 2001-268858 A discloses a motor rotor including: a hollow rotation shaft (shaft) having a pipe structure; and a laminated core (rotor core) through which the rotation shaft is inserted. The rotation shaft is provided with disconnection preventers formed by a hydroforming process. The disconnection preventers are formed by radially outwardly expanding the rotation shaft by the hydroforming process. The number of disconnection preventers provided is two such that the laminated core is interposed between the disconnection preventers in an axial direction, with one of the disconnection preventers located on a first axial side of the laminated core and the other one of the disconnection preventers located on a second axial side of the laminated core. The laminated core and the rotation shaft are thus fixed (or positioned) in the axial direction by the two disconnection preventers.

Manufacturing the motor rotor described in JP 2001-268858 A involves performing hydroforming, with hydroforming shaping dies (dies) each disposed away from an associated one of end faces of the laminated core (rotor core) by a predetermined distance. Such hydroforming radially outwardly expands portions of the rotation shaft between the end faces of the laminated core and the shaping dies (dies) so as to form the disconnection preventers. During hydroforming, the rotation shaft is fixed by the forming dies (dies) disposed on both sides in the axial direction.

RELATED ART DOCUMENTS

Patent Documents

Patent Document 1: JP 2001-268858 A

SUMMARY OF THE DISCLOSURE

Problem to be Solved by the Invention

The rotor manufacturing method described in JP 2001-268858 A, however, involves providing the laminated core (rotor core) at a position away from the hydroforming shaping dies (dies) during hydroforming as described above, so that hydroforming is performed, with no load applied to the end faces of the laminated core. Performing hydroforming in this manner may create gaps between electromagnetic steel sheets that are components of the laminated core, causing variations in the thickness of the laminated core between products (i.e., between motor rotors). This disadvantageously results in variations in the positions of the end faces of the laminated core in the axial direction. In such a case, variations unfortunately occur in the relative positional relationship between the rotation shaft (shaft) and the laminated core (rotor core).

This disclosure has been made to solve the above-described problems. An object of this disclosure is to provide a rotor manufacturing method and a rotor manufacturing apparatus that are able to prevent occurrence of variations in the relative positional relationship between a shaft and a rotor core.

Means for Solving the Problem

To achieve the above object, a rotor manufacturing method according to a first aspect of this disclosure is a method for manufacturing a rotor that includes: an annular rotor core provided with a shaft insertion hole; and a tubular shaft. The method includes the steps of: inserting the shaft into the shaft insertion hole of the rotor core; pressing the rotor core in a central axis direction of the rotor core by using a core pressing member; and fixing the shaft to the rotor core by performing, with the rotor core pressed, hydroforming that involves filling a fluid into the shaft and pressurizing the fluid so as to expand the shaft, thus pressure-welding the shaft to an inner peripheral surface of the shaft insertion hole.

The armature rotor manufacturing method according to the first aspect of this disclosure makes it possible to perform hydroforming, with the rotor core pressed by the core pressing member, as described above. Thus, hydroforming is performable, with the core pressing member preventing gaps from being created between electromagnetic steel sheets that are components of the rotor core. Accordingly, hydroforming is performable, with the thickness of the rotor core falling within a certain range (i.e., within tolerance limits). Consequently, the first aspect of this disclosure is able to prevent variations in the relative positional relationship between the shaft and the rotor core (which may occur between products).

A rotor manufacturing apparatus according to a second aspect of this disclosure is an apparatus for manufacturing a rotor that includes: an annular rotor core provided with a shaft insertion hole; and a tubular shaft. The apparatus includes: a die presser including a core pressing member to press the rotor core in a central axis direction of the rotor core; and a hydroformer to perform, with the rotor core pressed, hydroforming that involves filling a fluid into the shaft and pressurizing the fluid so as to expand the shaft, thus pressure-welding the shaft to an inner peripheral surface of the shaft insertion hole.

The armature rotor manufacturing apparatus according to the second aspect of this disclosure makes it possible to perform hydroforming, with the rotor core pressed by the core pressing member, as described above. Thus, hydroforming is performable, with the core pressing member preventing gaps from being created between electromagnetic steel sheets that are components of the rotor core. Accordingly, hydroforming is performable, with the thickness of the rotor core falling within a certain range (i.e., within tolerance limits). Consequently, the second aspect of this disclosure is able to provide the rotor manufacturing apparatus capable of preventing variations in the relative positional relationship between the shaft and the rotor core (which may occur between products).

Effects of the Invention

The present disclosure is able to prevent occurrence of variations in the relative positional relationship between a shaft and a rotor core as described above.

BRIEF DESCRIPTION OF THE DRAWINGS

FIG. 6 is a plan view of a plate according to the first embodiment.

FIG. 7 is a plan view of a guide according to the first embodiment.

MODES FOR CARRYING OUT THE DISCLOSURE

Embodiments of the present disclosure will be described below with reference to the drawings.

First Embodiment

Structure of Rotor

Referring to FIGS. 1 to 14, a structure of a rotor 10 according to a first embodiment will be described.

Figure 1:
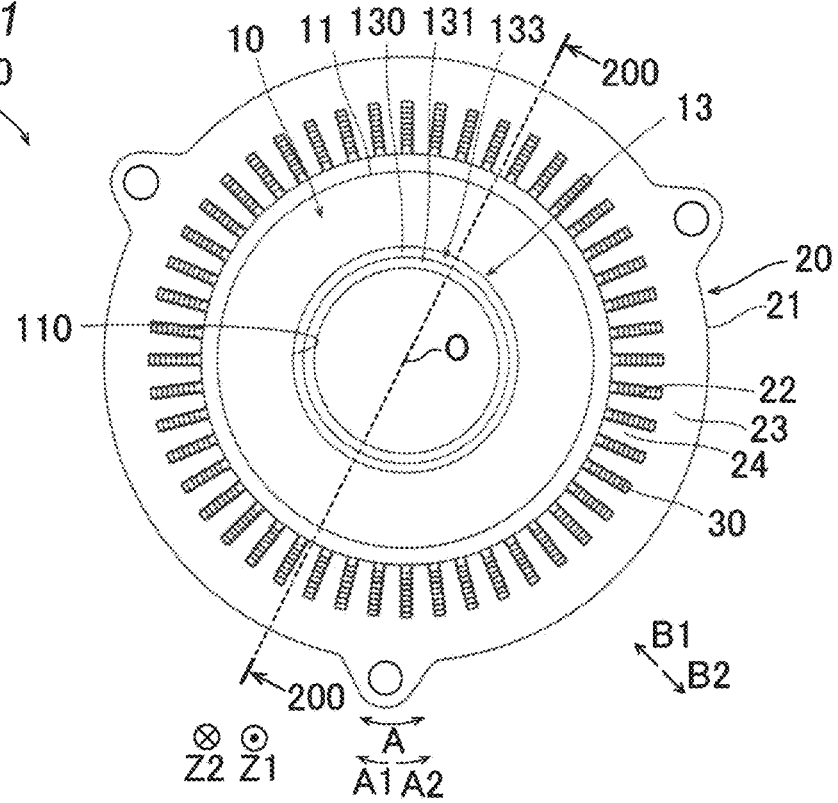
FIG. 1 is a plan view of a rotary electric machine according to first to third embodiments.

As used herein, the term "axial direction" refers to a direction (i.e., a direction Z1 and a direction Z2) along a rotation axis (which is denoted by the reference sign O) of the rotor 10 (see FIG. 1). The term "circumferential direction" refers to a circumferential direction (i.e., a direction A, a direction A1, and a direction A2) of a rotor core 11. The term "radially inner side" refers to a direction (i.e., a direction B1) toward the center of the rotor core 11. The term "radially outer side" refers to a direction (i.e., a direction B2) outward from the rotor core 11.

As illustrated in FIG. 1, a rotary electric machine 100 includes the rotor 10 and a stator 20. The stator 20 includes an annular stator core 21. The stator core 21 is provided with slots 22. Segment conductors 30 are each disposed in an associated one of the slots 22. The stator core 21 includes: a back yoke 23 defining an annular portion of the stator core 21 located radially outward of the slots 22; and teeth 24 each defined between adjacent ones of the slots 22 and extending radially inward from the back yoke 23. Insulating members (not illustrated) for insulating the segment conductors 30 from the stator core 21 are disposed in the slots 22.

The rotor 10 includes the rotor core 11 having an annular shape. The rotor core 11 is formed by stacking electromagnetic steel sheets 12 (see FIG. 2). The rotor core 11 is disposed radially inward of the annular stator core 21 such that the rotor core 11 faces the stator core 21 in a radial direction. Thus, the rotary electric machine 100 is an inner rotor type rotary electric machine. The rotor core 11 includes a shaft insertion hole 110 into which a shaft 13 (which will be described below) is to be inserted.

The rotor 10 includes the shaft 13. The shaft 13 functions as a rotation shaft of the rotor core 11. The shaft 13 has a tubular shape. To be more specific, the shaft 13 has a hollow shape and is formed to extend in the axial direction (i.e., a direction Z).

Figure 2:
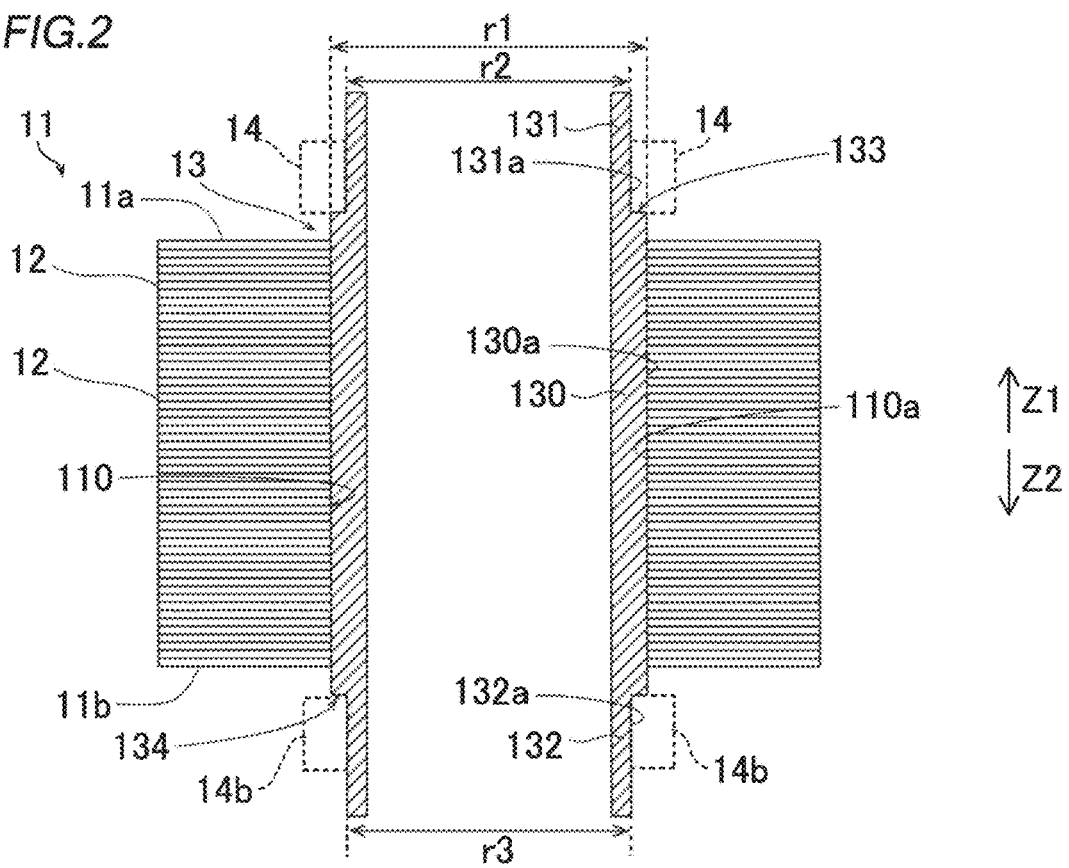
FIG. 2 is a cross-sectional view of a rotor core and a shaft according to the first to third embodiments.

Specifically, as illustrated in FIG. 2, the shaft 13 includes: a tubular portion 130 that is a portion of the shaft 13 fixed to an inner peripheral surface 110a of the shaft insertion hole 110 of the rotor core 11; and a tubular portion 131 disposed on a first side in a central axis direction of the rotor core 11 (i.e., disposed in the direction Z1) relative to the tubular portion 130. The tubular portion 131 protrudes to the first side in the central axis direction (i.e., protrudes in the direction Z1) relative to an end face 11a of the rotor core 11 located on the first side in the central axis direction (i.e., located in the direction Z1). A step portion 133 of the shaft 13 (which will be described below) is disposed on the first side in the central axis direction (i.e., disposed in the direction Z1) relative to the end face 11a of the rotor core 11. The tubular portion 130 is an example of a "first tubular portion" in the claims. The tubular portion 131 is an example of a "second tubular portion" in the claims.

The tubular portion 130 has a diameter r1. The second tubular portion has a diameter r2 smaller than the diameter r1 of the tubular portion 130. The diameter r1 is the diameter of an outer peripheral surface 130a of the tubular portion 130 (i.e., the outside diameter of the tubular portion 130). The diameter r2 is the diameter of an outer peripheral surface 131a of the tubular portion 131 (i.e., the outside diameter of the tubular portion 131).

The shaft 13 includes a tubular portion 132 disposed on a second side in the central axis direction of the rotor core 11 (i.e., disposed in the direction Z2) relative to the tubular portion 130. The tubular portion 132 protrudes to the second side in the central axis direction (i.e., protrudes in the direction Z2) relative to an end face 11b of the rotor core 11 located on the second side in the central axis direction (i.e., located in the direction Z2). A step portion 134 of the shaft 13 (which will be described below) is disposed on the second side in the central axis direction (i.e., disposed in the direction Z2) relative to the end face 11b. The tubular portion 132 has a diameter r3 substantially equal to the diameter r2 of the second tubular portion. The diameter r3 is the diameter of an outer peripheral surface 132a of the tubular portion 132 (i.e., the outside diameter of the tubular portion 132).

The shaft 13 includes the step portion 133 that defines a boundary between the tubular portion 130 and the tubular portion 131. As viewed in the central axis direction (i.e., from the direction Z1), the step portion 133 has an annular shape (see FIG. 1). The step portion 133 is provided in the form of a bearing placement portion on which a bearing 14 for the shaft 13 is to be placed.

The shaft 13 includes the step portion 134 that defines a boundary between the tubular portion 130 and the tubular portion 132. As viewed in the central axis direction (i.e., from the direction Z2), the step portion 134 has an annular shape similarly to the step portion 133.

Structure of Rotor Manufacturing Apparatus

Figure 3:
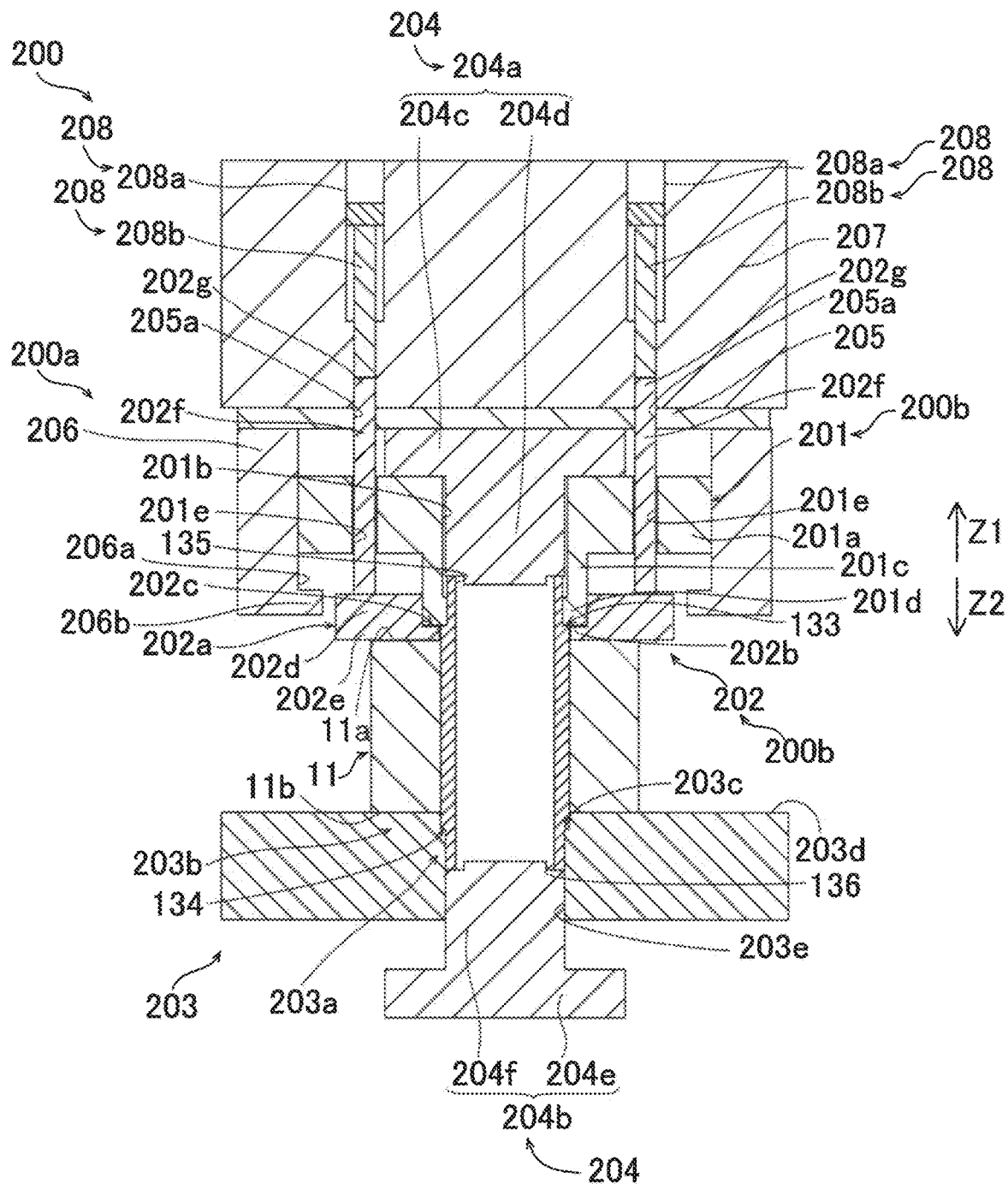
FIG. 3 is a cross-sectional view of a rotor manufacturing apparatus according to the first embodiment.
Figure 4:
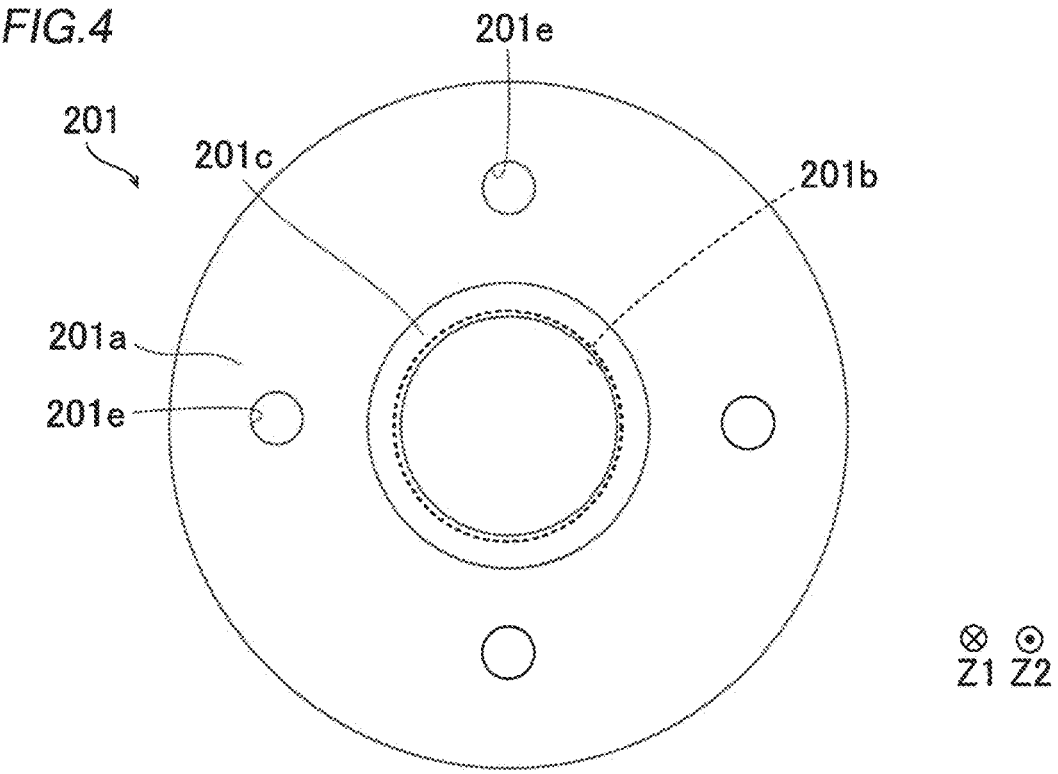
FIG. 4 is a plan view of a shaft pressing member according to the first embodiment.

As illustrated in FIG. 3, a manufacturing apparatus 200 for the rotor 10 includes a hydroforming die 200a. The hydroforming die 200a includes a die presser 200b. The manufacturing apparatus 200 (200a, 200b) for the rotor 10 includes a shaft pressing member 201 and a core pressing member 202.

The shaft pressing member 201 is structured to press the step portion 133 (which will be described below) from the first side in the central axis direction (i.e., from the direction Z1). The shaft pressing member 201 includes a shaft pressing member body 201a having an annular shape (see FIG. 4). The shaft pressing member body 201a is centrally provided with a through hole 201b. As viewed in the central axis direction, the shaft pressing member 201 is provided to overlap with a core pressing member body 202a (which will be described below).

The shaft pressing member 201 includes a tubular presser 201c provided on the inner peripheral side of the shaft pressing member body 201a. The tubular presser 201c is provided to extend to the second side in the central axis direction (i.e., extend in the direction Z2) from the shaft pressing member body 201a. As viewed in the central axis direction (i.e., from the direction Z2), the tubular presser 201c is provided to extend along the outer peripheral edge of the through hole 201b of the shaft pressing member body 201a (see FIG. 4).

In the first embodiment, the tubular presser 201c is provided to guide the tubular portion 131 of the shaft 13 from its outer peripheral side, with an end 201d of the tubular presser 201c in abutment with the step portion 133. The end 201d of the tubular presser 201c is located on the second side in the central axis direction (i.e., located in the direction Z2). Specifically, the tubular presser 201c is disposed such that the tubular presser 201c is interposed between the tubular portion 131 of the shaft 13 and an upper portion 202d (which will be described below) of the core pressing member body 202a, with the end 201d of the tubular presser 201c in abutment with the step portion 133.

The shaft pressing member body 201a is provided with through holes 201e through which core pressing member side shafts 202f (which will be described below) pass. In the first embodiment, the number of through holes 201e is four (see FIG. 4). The through holes 201e are provided at equiangular intervals around the through hole 201b. The number of core pressing member side shafts 202f and the number of through holes 201e are each not limited to four but may each be, for example, two or three.

The shaft pressing member 201 is structured to be movable between hydraulic cylinders 208 (which will be described below) and the core pressing member body 202a independently of the core pressing member side shafts 202f, with the core pressing member side shafts 202f passing through the through holes 201e. In other words, the shaft pressing member 201 is structured to slide along the core pressing member side shafts 202f, with the core pressing member side shafts 202f passing through the through holes 201e.

The core pressing member 202 is structured to press the end face 11a of the rotor core 11 from the first side in the central axis direction (i.e., from the direction Z1). The core pressing member 202 is structured to be operable independently of the shaft pressing member 201.

The core pressing member 202 includes the core pressing member body 202a that comes into abutment with the end face 11a of the rotor core 11. The core pressing member body 202a has an annular shape (see FIG. 5). Specifically, the core pressing member body 202a is centrally provided with a through hole 202b.

The core pressing member body 202a is provided with a step portion 202c. The core pressing member body 202a includes: the upper portion 202d disposed on the first side in the central axis direction (i.e., disposed in the direction Z1) relative to the step portion 202c; and a lower portion 202e disposed on the second side in the central axis direction (i.e., disposed in the direction Z2) relative to the step portion 202c. A diameter r4 (see FIG. 5) of a portion of the through hole 202b of the core pressing member 202 defined in the upper portion 202d is larger than a diameter r5 (see FIG. 5) of a portion of the through hole 202b of the core pressing member 202 defined in the lower portion 202e.

The upper portion 202d of the core pressing member 202 is provided to guide the tubular presser 201c of the shaft pressing member 201 from its outer peripheral side. The lower portion 202e is provided to guide a portion of the shaft 13 adjacent to an end of the tubular portion 130 located on the first side in the central axis direction (i.e., an end of the tubular portion 130 located in the direction Z1) from its outer peripheral side.

The core pressing member 202 includes the core pressing member side shafts 202f extending to the first side in the central axis direction (i.e., extending in the direction Z1) from the core pressing member body 202a. The number of core pressing member side shafts 202f provided is equal to the number of through holes 201e of the shaft pressing member body 201a (which means that the number of core pressing member side shafts 202f is four). Each of the core pressing member side shafts 202f is provided to pass through an associated one of the through holes 201e.

In the first embodiment, the manufacturing apparatus 200 (which includes the die 200a) for the rotor 10 includes a fixing base 203 including a shaft fixer 203a and a rotor core fixer 203b. The shaft fixer 203a is integral with the rotor core fixer 203b.

The shaft fixer 203a is disposed on the second side in the central axis direction (i.e., disposed in the direction Z2) relative to the shaft 13. The shaft fixer 203a is provided to fix the shaft 13 from the second side in the central axis direction (i.e., from the direction Z2). Specifically, the shaft fixer 203a is disposed to fix (or retain) the step portion 134 of the shaft 13. To be more specific, the fixing base 203 is provided with a step portion 203c which is defined on a boundary between the shaft fixer 203a and the rotor core fixer 203b and on which the step portion 134 of the shaft 13 is to be placed.

The rotor core fixer 203b is disposed on the second side in the central axis direction (i.e., disposed in the direction Z2) relative to the core pressing member 202 (and the rotor core 11). The rotor core fixer 203b is provided to fix the rotor core 11 from the second side in the central axis direction (i.e., from the direction Z2). Specifically, the rotor core 11 is fixed (or retained) by being placed on an end face 203d of the rotor core fixer 203b located on the first side in the central axis direction (i.e., located in the direction Z1).

In the first embodiment, the manufacturing apparatus 200 (which includes the die 200a) for the rotor 10 includes a hydroformer 204 to perform hydroforming. Specifically, the hydroformer 204 includes an upper seal member 204a and a lower seal member 204b.

To be more specific, an opening 135 of the shaft 13 located on the first side in the central axis direction (i.e., located in the direction Z1) is closed by the upper seal member 204a, and an opening 136 of the shaft 13 located on the second side in the central axis direction (i.e., located in the direction Z2) is closed by the lower seal member 204b. In this state, a fluid 40 (see FIG. 14) is filled into the shaft 13 through a fluid introducing path (not illustrated) defined in the upper seal member 204a or the lower seal member 204b. Pressurizing the fluid 40 inside the shaft 13 causes the shaft 13 to expand, thus pressure-welding the tubular portion 130 (see FIG. 2) to the inner peripheral surface 110a (see FIG. 2) of the shaft insertion hole 110.

The upper seal member 204a includes: an upper seat 204c provided on the first side in the central axis direction; and an upper column 204d extending to the second side in the central axis direction (i.e., extending in the direction Z2) from the upper seat 204c. The upper column 204d is provided to be inserted into the through hole 201b of the shaft pressing member 201. The upper seal member 204a is provided such that the upper column 204d located inside the through hole 201b of the shaft pressing member 201 closes the opening 135 of the shaft 13.

The lower seal member 204b includes: a lower seat 204e provided on the second side in the central axis direction; and a lower column 204f extending to the first side in the central axis direction (i.e., extending in the direction Z1) from the lower seat 204e. The lower column 204f is provided to be inserted into a through hole 203e defined in the fixing base 203. The lower seal member 204b is provided such that the lower column 204f located inside the through hole 203e of the fixing base 203 closes the opening 136 of the shaft 13.

The manufacturing apparatus 200 (which includes the die 200a) for the rotor 10 includes a plate 205 provided such that the plate 205 is interposed between a moving mechanism 207 (which will be described below) and the upper seal member 204a (or the upper seat 204c). The plate 205 has a disk shape (see FIG. 6). The plate 205 is provided with through holes 205a that allow passage of rods 208b of the hydraulic cylinders 208 (which will be described below) and the core pressing member side shafts 202f therethrough. The number of through holes 205a provided is equal to the number of core pressing member side shafts 202f. In the first embodiment, the number of through holes 205a is four.

The manufacturing apparatus 200 (which includes the die 200a) for the rotor 10 includes a guide 206 provided along the outer peripheral edge of the plate 205 and extended to the second side in the central axis direction (i.e., extended in the direction Z2) from the plate 205. The guide 206 has an annular shape (see FIG. 7). The shaft pressing member 201 (or the shaft pressing member body 201a) is structured to slide along an inner peripheral surface 206a of the guide 206. The guide 206 includes a protrusion 206b provided on an end of the guide 206 located on the second side in the central axis direction (i.e., located in the direction Z2). The protrusion 206b is provided to protrude radially inward of the inner peripheral surface 206a. The protrusion 206b has an annular shape (see FIG. 7).

The manufacturing apparatus 200 for the rotor 10 includes the moving mechanism 207. The moving mechanism 207 is structured to be movable in the central axis direction in a region located on the first side in the central axis direction of the rotor core 11 (i.e., located in the direction Z1). The moving mechanism 207 is structured to move the shaft pressing member 201 and the core pressing member 202 together toward the rotor core 11 (i.e., in the direction Z2).

Figure 8:
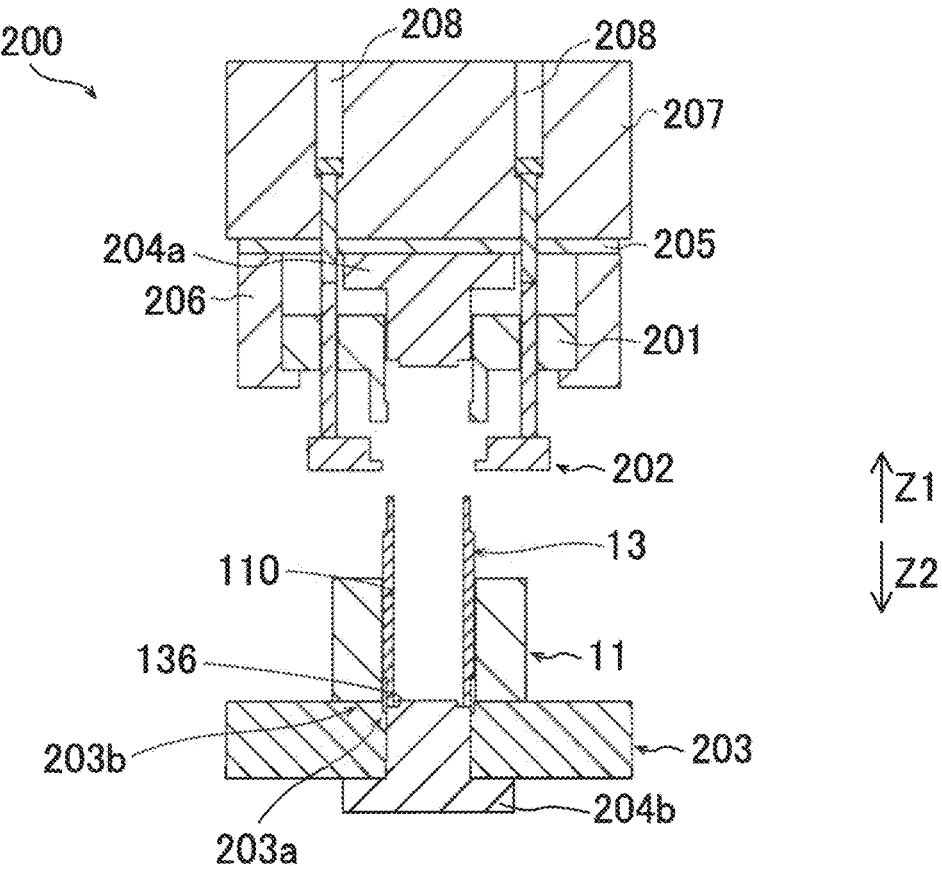
FIG. 8 is a cross-sectional view illustrating a state where the rotor core according to the first embodiment is placed on a fixing base.

The manufacturing apparatus 200 for the rotor 10 includes the hydraulic cylinders 208 provided between the moving mechanism 207 and the core pressing member 202 (see FIG. 8). In the first embodiment, the hydraulic cylinders 208 are structured to be driven by hydraulic pressure supplied from outside the moving mechanism 207. The hydraulic cylinders 208 are structured to be extensible and contractible in the central axis direction by movement of the rods 208b in the central axis direction caused by pressure of a fluid flowing into cylinder tubes 208a. The cylinder tubes 208a are provided inside the moving mechanism 207. The number of hydraulic cylinders 208 provided is two or more such that the hydraulic cylinders 208 are each associated with one of the core pressing member side shafts 202f of the core pressing member 202. In this embodiment, the number of hydraulic cylinders 208 is four. Each of the hydraulic cylinders 208 is an example of a "first cylinder" and an example of an "extensible and contractible member" in the claims.

In the first embodiment, the hydraulic cylinders 208 are provided adjacent, in the central axis direction, to ends 202g of the core pressing member side shafts 202f protruding to the first side in the central axis direction (i.e., protruding in the direction Z1) from the through holes 201e of the shaft pressing member 201. Specifically, the tips of the rods 208b of the hydraulic cylinders 208 are in contact with the ends 202g of the core pressing member side shafts 202f located on the first side in the central axis direction (i.e., located in the direction Z1).

The moving mechanism 207 is structured to press the step portion 133 through the shaft pressing member 201. The hydraulic cylinders 208 are structured to press the end face 11a of the rotor core 11 through the core pressing member 202. A pressing force independent of (i.e., having no correlation to) a pressing force exerted by the moving mechanism 207 is applied to the end face 11a of the rotor core 11 from the hydraulic cylinders 208 through the core pressing member 202.

Rotor Manufacturing Method

Referring to FIG. 1, FIGS. 3 to 5, and FIGS. 8 to 14, a method for manufacturing the rotor 10 will be described below.

First, the rotor core 11 is placed on the fixing base 203 (or the rotor core fixer 203b) as illustrated in FIG. 8. Thus, the rotor core 11 is fixed from the second side in the central axis direction (i.e., from the direction Z2).

The opening 136 of the shaft 13 located on the second side in the central axis direction (i.e., located in the direction Z2) is closed by the lower seal member 204b.

At this point, a portion of the shaft 13 located on the second side in the central axis direction is inserted into the shaft insertion hole 110 of the rotor core 11. At this point, the shaft 13 is not yet fixed by the fixing base 203 (or the shaft fixer 203a).

As illustrated in FIGS. 9 to 12, the first embodiment involves performing the step of pressing the step portion 133 of the shaft 13 from the first side in the central axis direction (i.e., from the direction Z1) by using the shaft pressing member 201, and pressing the end face 11a of the rotor core 11 from the first side in the central axis direction (i.e., from the direction Z1) by using the core pressing member 202 operable independently of the shaft pressing member 201. Specifically, the step of pressing the shaft 13 and the rotor core 11 involves moving the shaft pressing member 201 and the core pressing member 202 together toward the rotor core 11 (i.e., in the direction Z2) by using the moving mechanism 207, thus pressing the step portion 133 by using the shaft pressing member 201 and pressing the end face 11a of the rotor core 11 by using the hydraulic cylinders 208 through the core pressing member 202. In other words, the step of pressing the shaft 13 and the rotor core 11 involves: pressing the step portion 133 by using the shaft pressing member 201 included in the hydroforming die 200a (or the die presser 200b); and pressing the end face 11a of the rotor core 11 by using the core pressing member 202 included in the die 200a (or the die presser 200b). This step will be described in more detail below.

Figure 9:
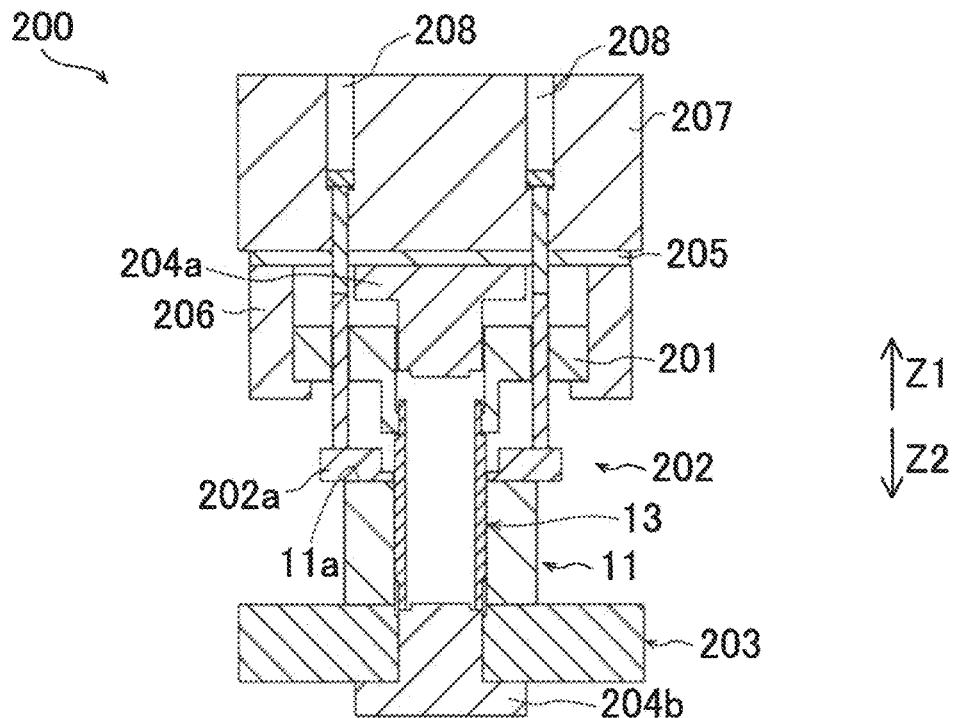
FIG. 9 is a cross-sectional view illustrating a state where the core pressing member according to the first embodiment is in abutment with the rotor core.

As illustrated in FIG. 9, the moving mechanism 207 first moves the shaft pressing member 201 and the core pressing member 202 together toward the rotor core 11 (i.e., in the direction Z2) until the core pressing member 202 comes into abutment with the end face 11a of the rotor core 11. The core pressing member 202 (or the core pressing member body 202a) is thus brought into abutment with the end face 11a of the rotor core 11.

Figure 10:
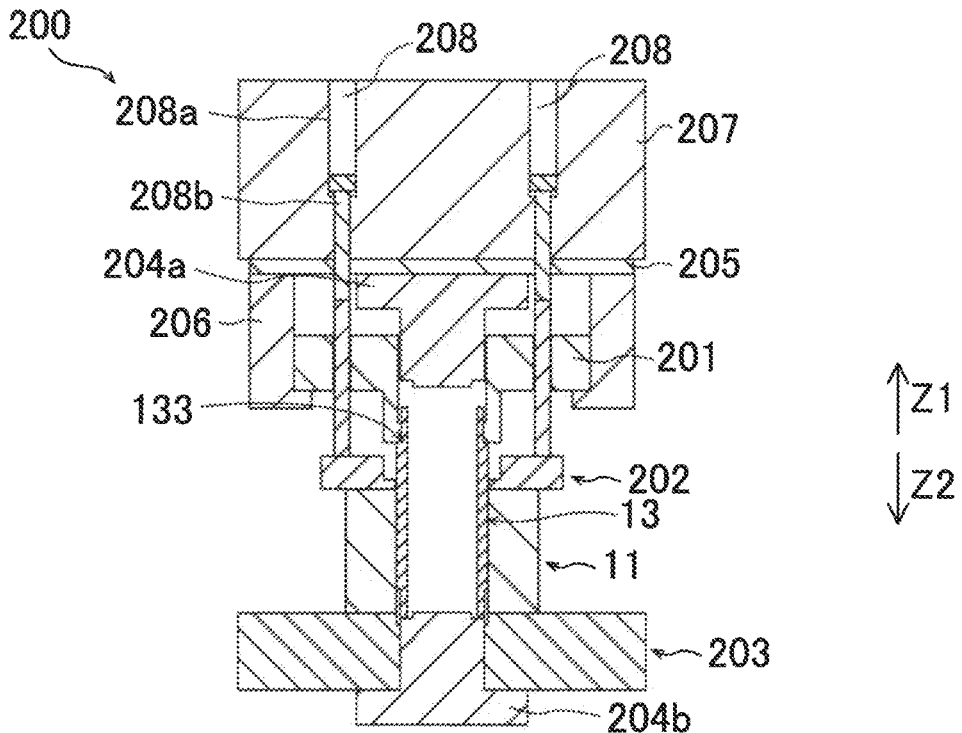
FIG. 10 is a cross-sectional view illustrating a state where the shaft pressing member according to the first embodiment is in abutment with a step portion of the shaft.

As illustrated in FIG. 10, the moving mechanism 207 then moves the shaft pressing member 201 further toward the rotor core 11 (i.e., in the direction Z2), so that the shaft pressing member 201 comes into abutment with the step portion 133 of the shaft 13. In this case, the rods 208b of the hydraulic cylinders 208 are pushed into the cylinder tubes 208a by the core pressing member 202 (or the core pressing member side shafts 202f), thus causing the hydraulic cylinders 208 to contract.

Figure 11:
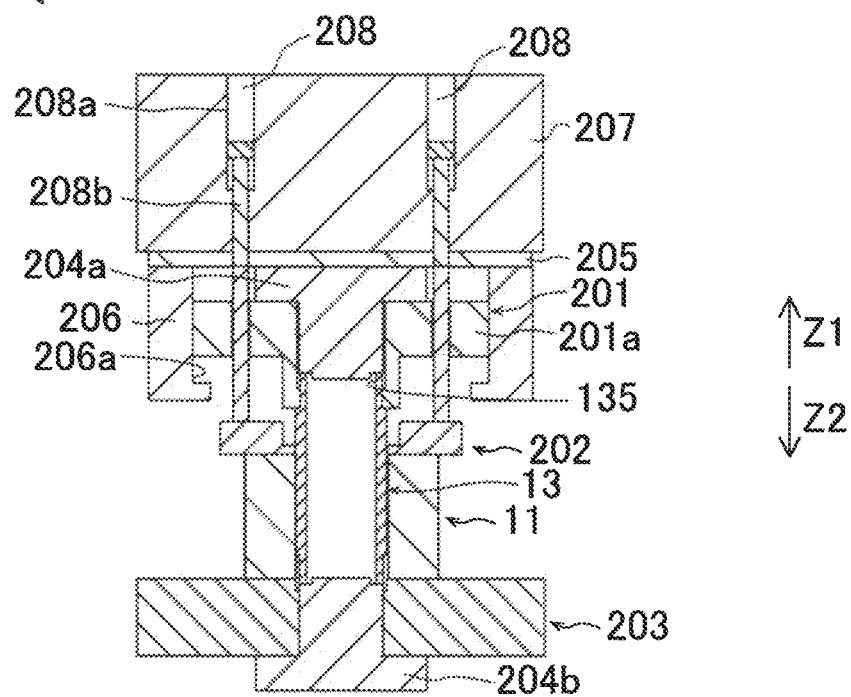
FIG. 11 is a cross-sectional view illustrating a state where an upper seal member according to the first embodiment is in abutment with the shaft pressing member.

As illustrated in FIG. 11, the moving mechanism 207 then moves the upper seal member 204a until the upper seal member 204a comes into abutment with the shaft pressing member 201 (or the shaft pressing member body 201a). In this case, the moving mechanism 207 moves the guide 206 to the second side in the central axis direction, so that the shaft pressing member 201 (or the shaft pressing member body 201a) slides along the inner peripheral surface 206a of the guide 206. Also in this case, the rods 208b of the hydraulic cylinders 208 are pushed further into the cylinder tubes 208a by the core pressing member 202 (or the core pressing member side shafts 202f), thus causing the hydraulic cylinders 208 to contract to a greater degree than those in the state illustrated in FIG. 10.

As a result of the movement of the upper seal member 204a in this case, the opening 135 of the shaft 13 located on the first side in the central axis direction (i.e., located in the direction Z1) is closed by the upper seal member 204a.

Figure 12:
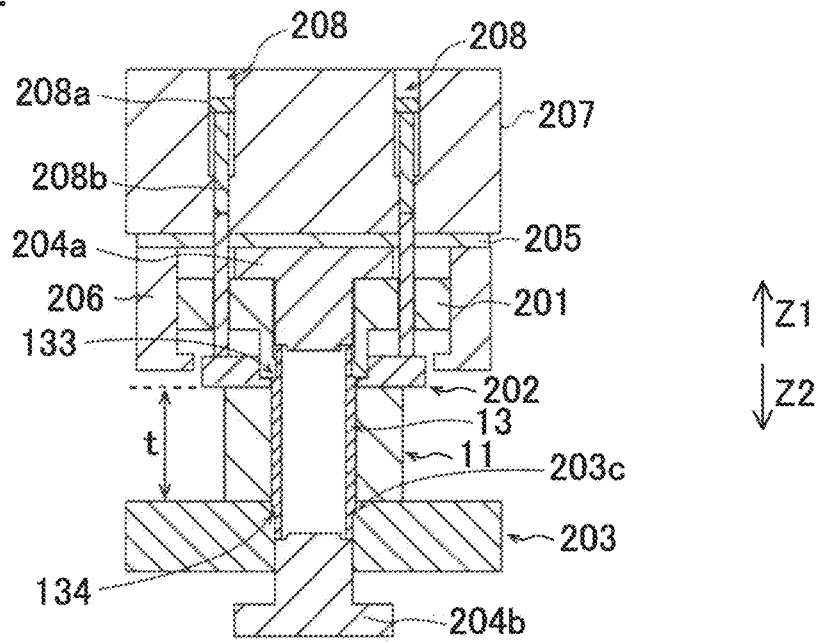
FIG. 12 is a cross-sectional view illustrating a state where the shaft according to the first embodiment is in abutment with the fixing base.

As illustrated in FIG. 12, the moving mechanism 207 then moves the upper seal member 204a, the shaft pressing member 201, and the shaft 13 together to the second side in the central axis direction (i.e., in the direction Z2) until the step portion 134 of the shaft 13 comes into abutment with the step portion 203c of the fixing base 203. In this case, the rods 208b of the hydraulic cylinders 208 are pushed further into the cylinder tubes 208a by the core pressing member 202 (or the core pressing member side shafts 202f), thus causing the hydraulic cylinders 208 to contract to a greater degree than those in the state illustrated in FIG. 11.

Accordingly, the step portion 133 of the shaft 13 is pressed by the moving mechanism 207 through the shaft pressing member 201, and the end face 11a of the rotor core 11 is pressed with the pressing force of the hydraulic cylinders 208 through the core pressing member 202.

In the first embodiment, the step of pressing the shaft 13 and the rotor core 11 involves pressing the step portion 133 from the first side in the central axis direction (i.e., from the direction Z1) by using the shaft pressing member 201, and pressing the end face 11a from the first side in the central axis direction (i.e., from the direction Z1) by using the core pressing member 202, thus effecting positioning of the shaft 13 and the rotor core 11 relative to each other. Specifically, the step of pressing the shaft 13 and the rotor core 11 involves pressing the step portion 133 by using the shaft pressing member 201 so as to press the shaft 13 against the shaft fixer 203a (or the fixing base 203), and pressing the end face 11a by using the core pressing member 202 so as to press the rotor core 11 against the rotor core fixer 203b (or the fixing base 203), thus effecting positioning of the rotor core 11 relative to the shaft 13.

Figure 13:
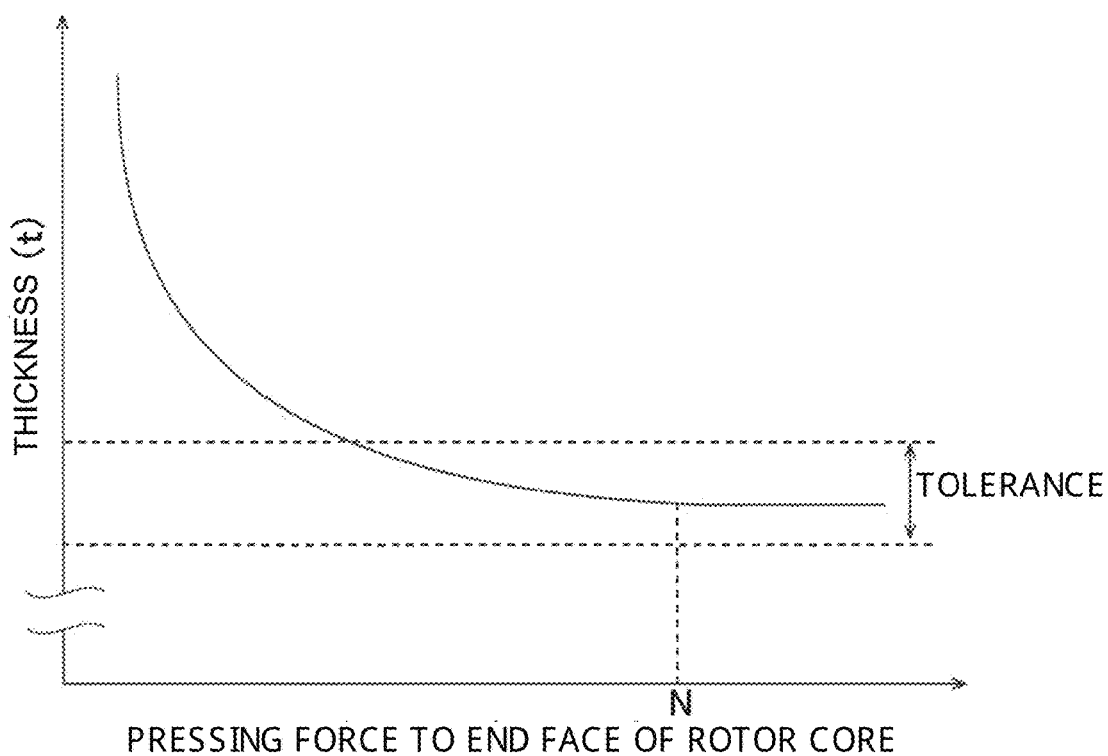
FIG. 13 is a graph indicating relationships between pressing forces applied to end faces of the rotor core and thicknesses of the rotor core.

More specifically, as illustrated in FIG. 13, pressing the end face 11a, with the rotor core 11 fixed to the rotor core fixer 203b (or the fixing base 203), reduces gaps between the electromagnetic steel sheets 12, causing the rotor core 11 to be compressed by a predetermined amount. In other words, a thickness t (see FIG. 12) of the rotor core 11 changes in accordance with a pressing force applied to the end face 11a. To be more specific, the greater the pressing force applied to the end face 11a, the smaller the thickness t of the rotor core 11.

When the pressing force is equal to or greater than a predetermined force (e.g., when the pressing force is equal to or greater than N indicated in FIG. 13), a rate of change in the thickness t with respect to the pressing force is equal to or lower than a predetermined value (which means that the rate of change remains nearly unchanged). Accordingly, applying a pressing force equal to or greater than N to the end face 11a of the rotor core 11 makes it possible to facilitate causing variations in the thickness t between products to fall within tolerance limits.

Fixing the shaft 13 to the shaft fixer 203a (or the fixing base 203) uniquely determines the position of the shaft 13 in the central axis direction. Thus, adjusting the pressing force to be applied to the end face 11a of the rotor core 11 enables positioning of the shaft 13 and the rotor core 11 relative to each other.

In the first embodiment, pressing the end face 11a of the rotor core 11 with the pressing force of the hydraulic cylinders 208 through the core pressing member 202 involves pressing the end face 11a of the rotor core 11 through the core pressing member 202 by driving the hydraulic cylinders 208 with hydraulic pressure supplied from outside the moving mechanism 207. This means that only the pressing force, which is exerted by the hydraulically controlled hydraulic cylinders 208 and independent of the pressing force exerted by the moving mechanism 207, is applied to the end face 11a of the rotor core 11.

Pressing the step portion 133 of the shaft 13 by using the shaft pressing member 201 involves pressing the step portion 133, serving as the bearing placement portion on which the bearing 14 for the shaft 13 is to be placed, by using the shaft pressing member 201. In other words, the bearing placement portion on which the bearing 14 is to be placed serves also as the step portion 133 to be used to press the shaft 13.

Figure 5:
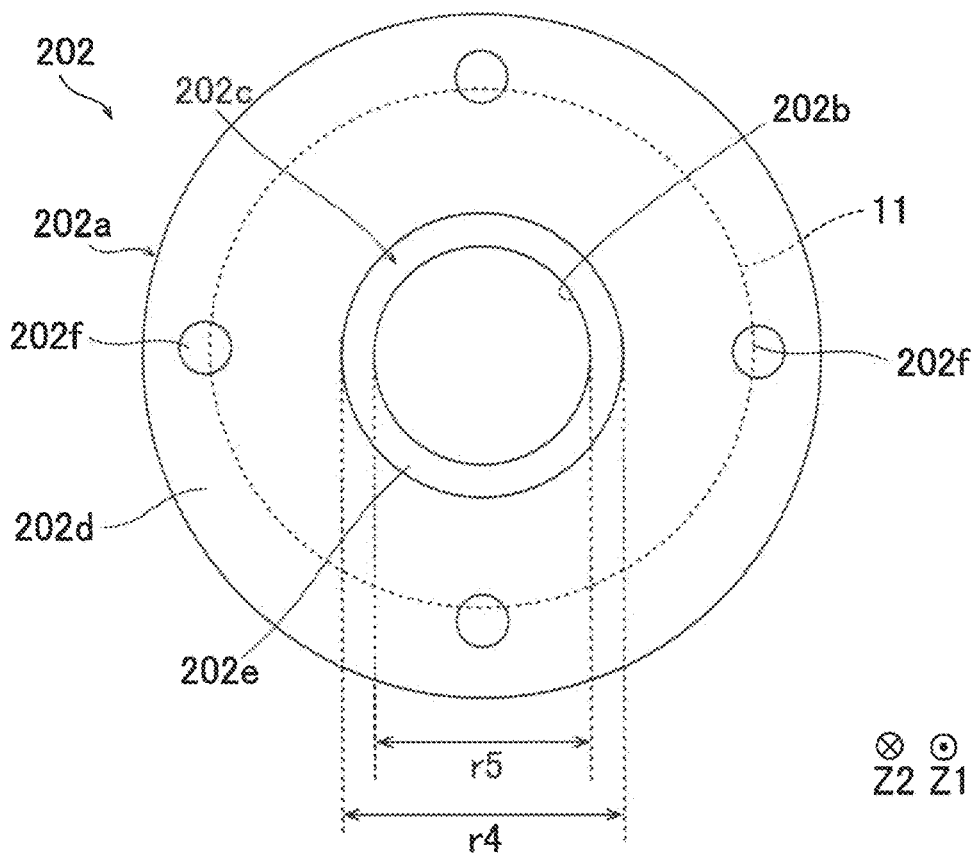
FIG. 5 is a plan view of a core pressing member according to the first embodiment.

Pressing the rotor core 11 involves pressing an entirety of the end face 11a of the rotor core 11 by using the core pressing member 202. As illustrated in FIG. 5, the core pressing member 202 is disposed to cover the entirety of the end face 11a (see FIG. 3) of the rotor core 11 as viewed in the central axis direction.

Pressing the shaft 13 involves pressing the step portion 133 of the shaft 13 along an entire circumference of the shaft 13 by using the shaft pressing member 201. This means that the step portion 133 of the shaft 13 having an annular shape (see FIG. 1) is pressed by the shaft pressing member 201 (or the tubular presser 201c) having an annular shape (see FIG. 4).

Thus, with the step portion 133 of the shaft 13 pressed along its entire circumference by the shaft pressing member 201, i.e., the tubular presser 201c (see FIG. 4), the entirety of the end face 11a of the rotor core 11 is pressed by the core pressing member 202.

Figure 14:
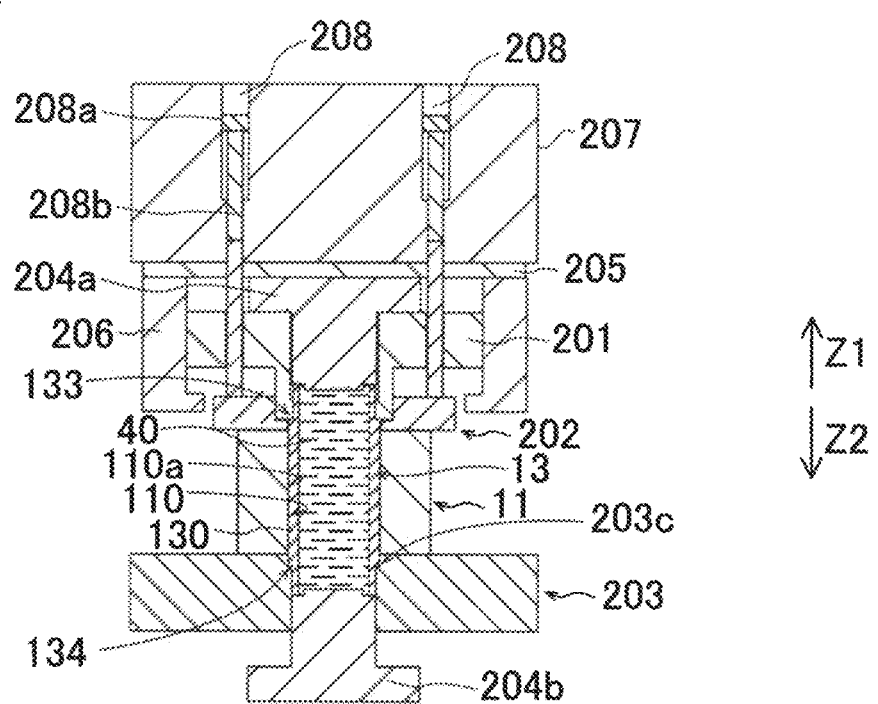
FIG. 14 is a cross-sectional view illustrating a state where a fluid is introduced into the shaft according to the first embodiment.

As illustrated in FIG. 14, the first embodiment involves fixing the shaft 13 to the rotor core 11 by performing, with the shaft 13 and the rotor core 11 pressed, hydroforming that involves filling the fluid 40 into the shaft 13 and pressurizing the fluid so as to expand the shaft 13, thus pressure-welding the tubular portion 130 to the inner peripheral surface 110a of the shaft insertion hole 110. In other words, with the shaft 13 and the rotor core 11 positioned relative to each other, hydroforming is performed so as to fix the shaft 13 to the rotor core 11.

Second Embodiment

Referring to FIG. 2 and FIGS. 15 to 23, a method for manufacturing a rotor 10 according to a second embodiment and a manufacturing apparatus 300 for the rotor 10 will be described below. Unlike the first embodiment involving using the hydraulically driven hydraulic cylinders 208, the method for manufacturing the rotor 10 according to the second embodiment and the manufacturing apparatus 300 for the rotor involve using air cylinders 308 that change elastically. Components similar to those in the first embodiment are illustrated with the same reference signs as those used in the first embodiment and will thus not be described.

Structure of Rotor Manufacturing Apparatus

Figure 15:
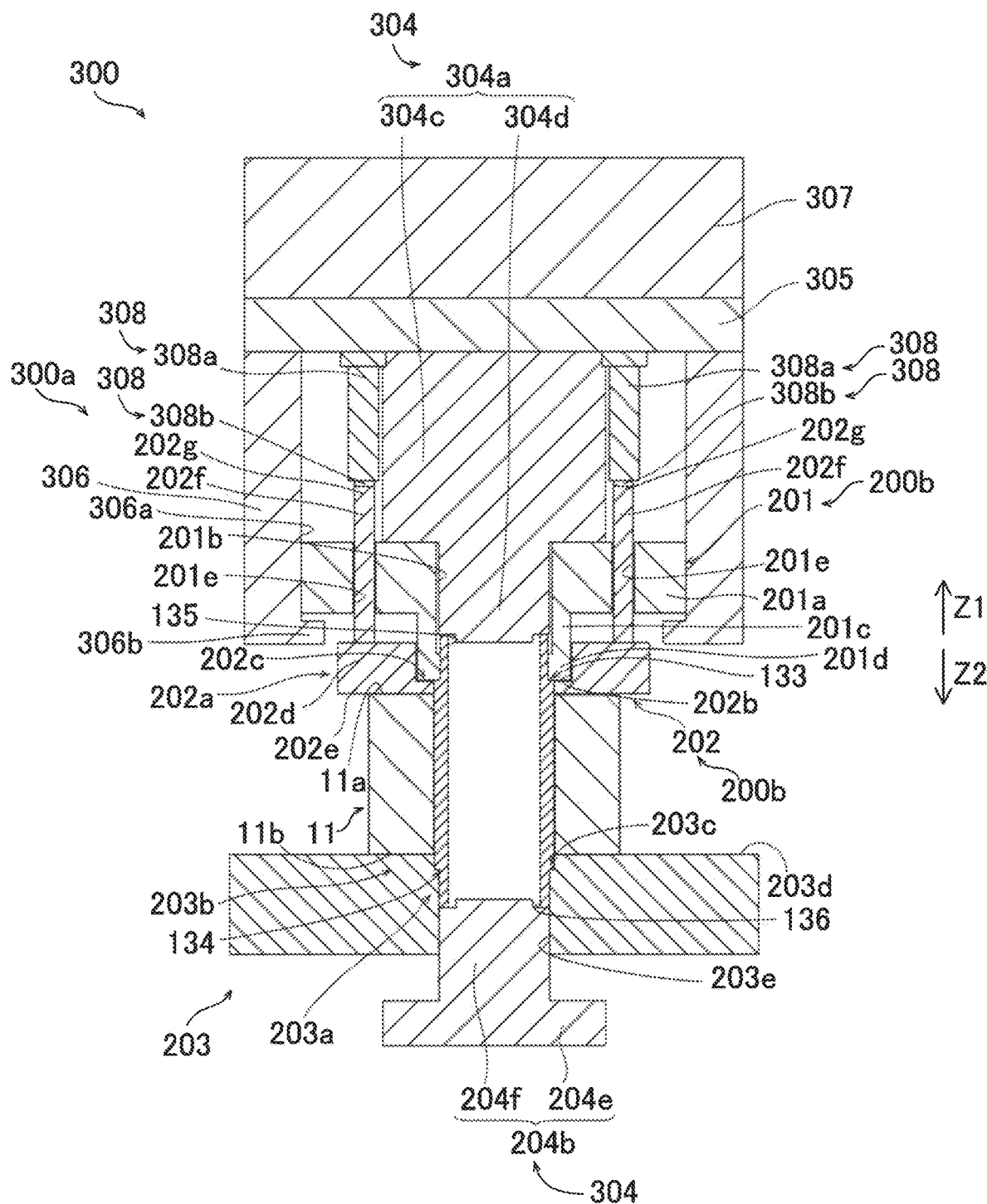
FIG. 15 is a cross-sectional view of a rotor manufacturing apparatus according to the second embodiment.
Figure 16:
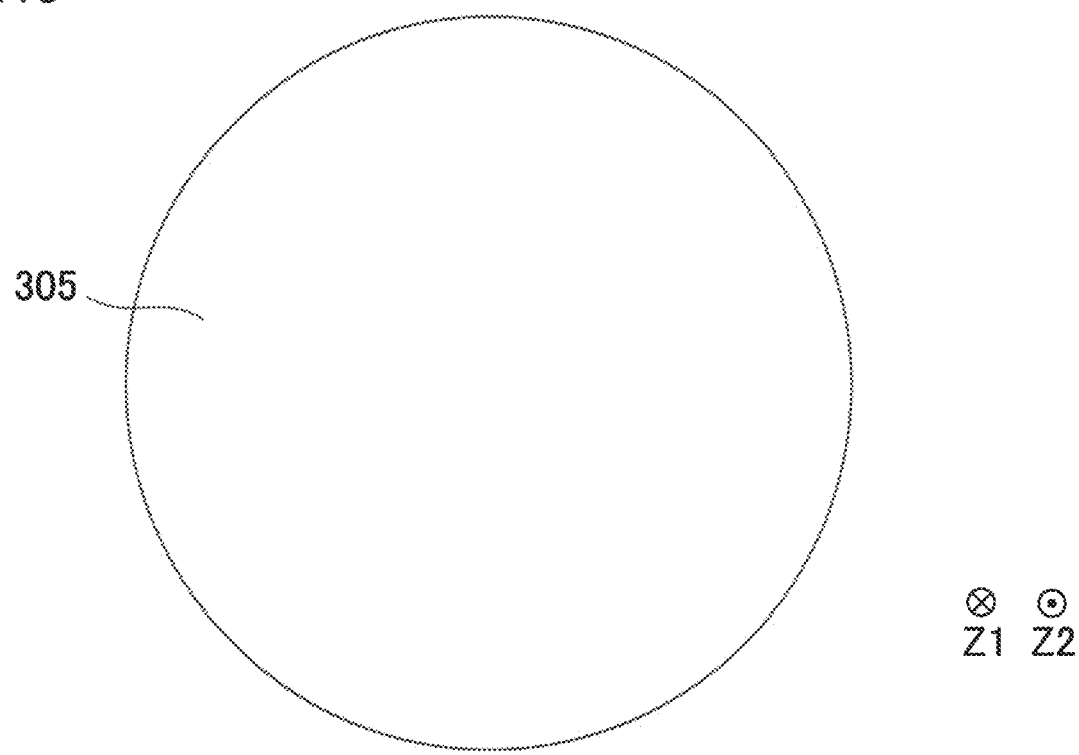
FIG. 16 is a plan view of a plate according to the second embodiment.
Figure 17:
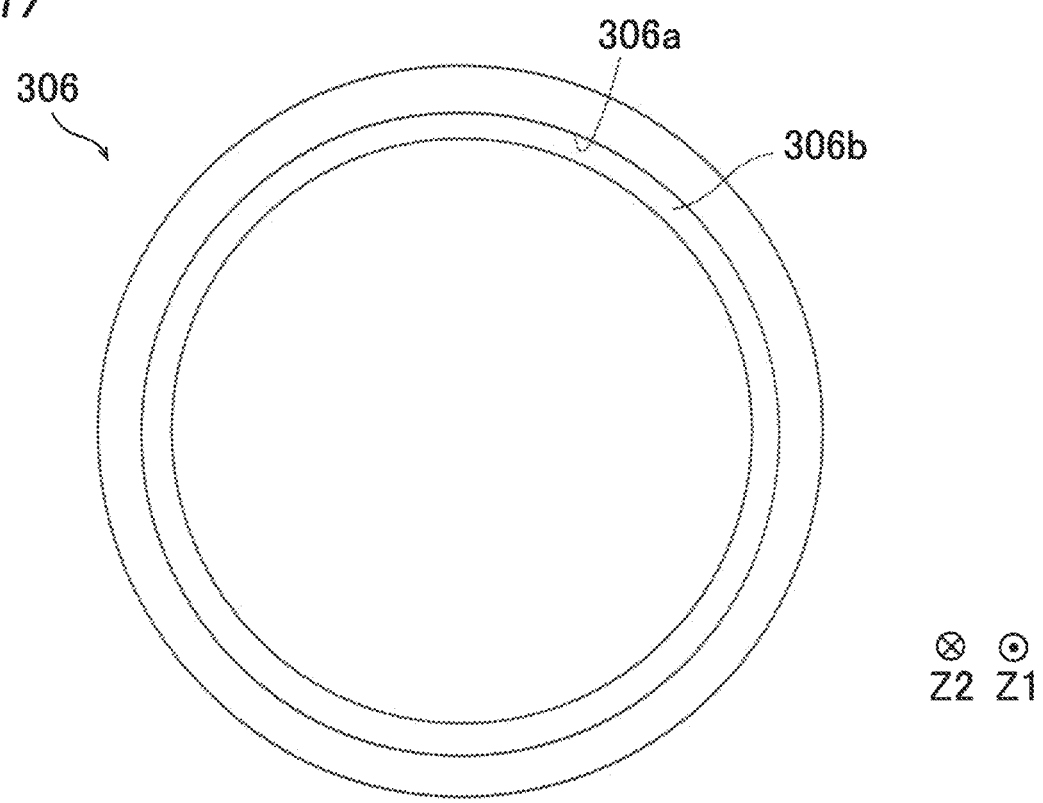
FIG. 17 is a plan view of a guide according to the second embodiment.

As illustrated in FIG. 15, the manufacturing apparatus 300 for the rotor includes a hydroforming die 300a. The hydroforming die 300a includes a die presser 200b. The manufacturing apparatus 300 (300a, 200b) for the rotor 10 includes a shaft pressing member 201 and a core pressing member 202.

In the second embodiment, the manufacturing apparatus 300 (which includes the die 300a) for the rotor 10 includes a hydroformer 304 to perform hydroforming. Specifically, the hydroformer 304 includes an upper seal member 304a and a lower seal member 204b.

To be more specific, an opening 135 of a shaft 13 located on a first side in a central axis direction (i.e., located in a direction Z1) is closed by the upper seal member 304a, and an opening 136 of the shaft 13 located on a second side in the central axis direction (i.e., located in a direction Z2) is closed by the lower seal member 204b. In this state, a fluid 40 is filled into the shaft 13 through a fluid introducing path (not illustrated) defined in the upper seal member 304a or the lower seal member 204b. Pressurizing the fluid 40 inside the shaft 13 causes the shaft 13 to expand, so that a tubular portion 130 (see FIG. 2) is pressure-welded to an inner peripheral surface 110a (see FIG. 2) of a shaft insertion hole 110.

The upper seal member 304a includes: an upper seat 304c provided on the first side in the central axis direction; and an upper column 304d extending to the second side in the central axis direction (i.e., extending in the direction Z2) from the upper seat 304c. The upper column 304d is provided to be inserted into a through hole 201b of the shaft pressing member 201. The upper seal member 304a is provided such that the upper column 304d located inside the through hole 201b of the shaft pressing member 201 closes the opening 135 of the shaft 13.

The manufacturing apparatus 300 (which includes the die 300a) for the rotor 10 includes a plate 305 provided such that the plate 305 is interposed between a moving mechanism 307 (which will be described below) and the upper seal member 304a (or the upper seat 304c). The plate 305 has a disk shape (see FIG. 16).

The manufacturing apparatus 300 (which includes the die 300a) for the rotor 10 includes a guide 306 provided along the outer peripheral edge of the plate 305 and extended to the second side in the central axis direction (i.e., extended in the direction Z2) from the plate 305. The guide 306 has an annular shape (see FIG. 17). The shaft pressing member 201 (or its shaft pressing member body 201a) is structured to slide along an inner peripheral surface 306a of the guide 306. The guide 306 includes a protrusion 306b provided on an end of the guide 306 located on the second side in the central axis direction. The protrusion 306b is provided to protrude radially inward of the inner peripheral surface 306a. The protrusion 306b has an annular shape (see FIG. 17).

The manufacturing apparatus 300 for the rotor 10 includes the moving mechanism 307. The moving mechanism 307 is structured to be movable in the central axis direction in a region located on the first side in the central axis direction of a rotor core 11 (i.e., located in the direction Z1).

As illustrated in FIG. 15, the manufacturing apparatus 300 for the rotor includes the air cylinders 308 provided between the moving mechanism 307 and the core pressing member 202. Specifically, the second embodiment involves clamping the air cylinders 308 between the moving mechanism 307 and the core pressing member 202. With the core pressing member 202 (or its core pressing member side shafts 202f) fixed, movement of the air cylinders 308 toward the core pressing member 202 (or the core pressing member side shafts 202f), i.e., in the direction Z2, pushes rods 308b into cylinder tubes 308a. This causes a change in the pressure inside the cylinder tubes 308a of the air cylinders 308, resulting in a change in the pressing force applied from the air cylinders 308 to an end face 11a of the rotor core 11 through the core pressing member 202. The number of air cylinders 308 provided is two or more such that the air cylinders 308 are each associated with one of the core pressing member side shafts 202f of the core pressing member 202. In this embodiment, the number of air cylinders 308 is four. Each of the air cylinders 308 is an example of a "second cylinder" and an example of the "extensible and contractible member" in the claims.

In the second embodiment, the air cylinders 308 are provided adjacent, in the central axis direction, to ends 202g of the core pressing member side shafts 202f protruding to the first side in the central axis direction (i.e., protruding in the direction Z1) from through holes 201e of the shaft pressing member 201. Specifically, the tips of the rods 308b of the air cylinders 308 are in contact with the ends 202g of the core pressing member side shafts 202f located on the first side in the central axis direction (i.e., located in the direction Z1).

The moving mechanism 307 is structured to press a step portion 133 through the shaft pressing member 201. The air cylinders 308 are structured to press the end face 11a of the rotor core 11 through the core pressing member 202. A pressing force independent of (i.e., having no correlation to) a pressing force exerted by the moving mechanism 307 is applied to the end face 11a of the rotor core 11 from the air cylinders 308 through the core pressing member 202.

Rotor Manufacturing Method

Referring to FIGS. 18 to 23, the method for manufacturing the rotor 10 will be described below.

Figure 18:
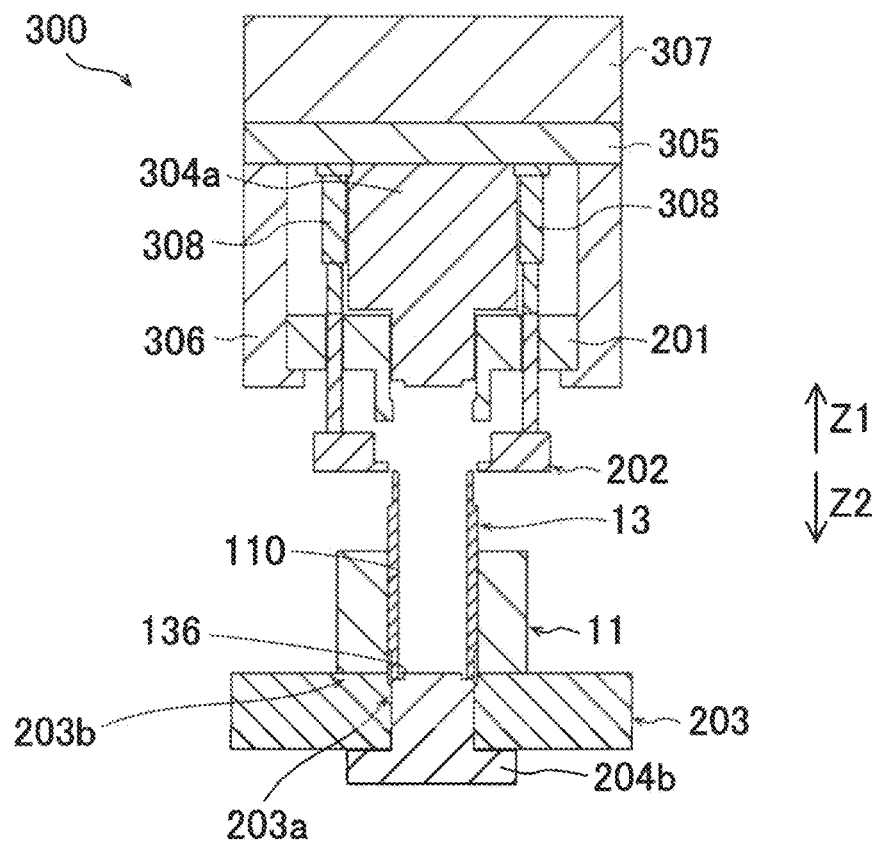
FIG. 18 is a cross-sectional view illustrating a state where the rotor core according to the second embodiment is placed on a fixing base.

First, the rotor core 11 is placed on a fixing base 203 (or its rotor core fixer 203b) as illustrated in FIG. 18. Thus, the rotor core 11 is fixed from the second side in the central axis direction (i.e., from the direction Z2).

The opening 136 of the shaft 13 located on the second side in the central axis direction (i.e., located in the direction Z2) is closed by the lower seal member 204b.

At this point, a portion of the shaft 13 located on the second side in the central axis direction is inserted into the shaft insertion hole 110 of the rotor core 11. At this point, the shaft 13 is not yet fixed by the fixing base 203 (or its shaft fixer 203a).

Figure 19:
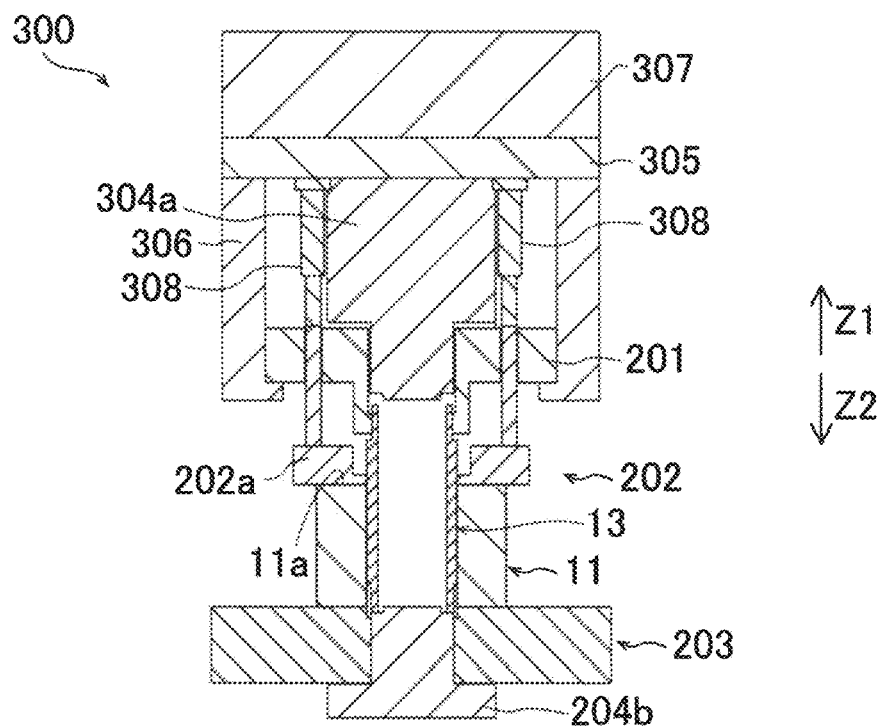
FIG. 19 is a cross-sectional view illustrating a state where a core pressing member according to the second embodiment is in abutment with the rotor core.

As illustrated in FIG. 19, the moving mechanism 307 then moves the shaft pressing member 201 and the core pressing member 202 together toward the rotor core 11 (i.e., in the direction Z2) until the core pressing member 202 comes into abutment with the end face 11a of the rotor core 11. The core pressing member 202 (or its core pressing member body 202a) is thus brought into abutment with the end face 11a of the rotor core 11.

Figure 20:
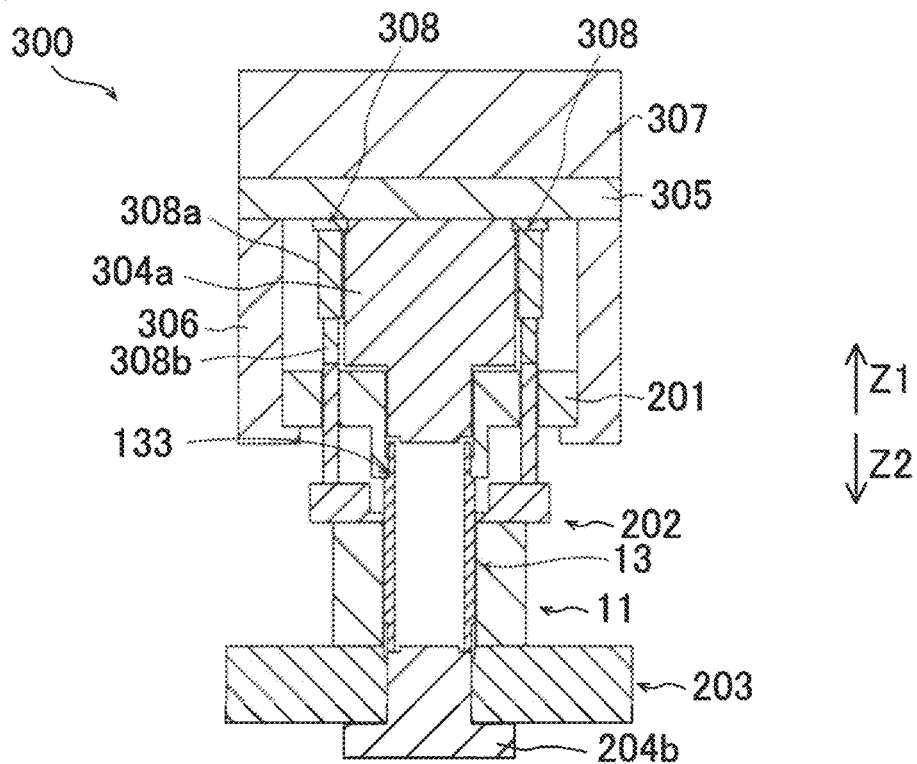
FIG. 20 is a cross-sectional view illustrating a state where a shaft pressing member according to the second embodiment is in abutment with a step portion of the shaft.

As illustrated in FIG. 20, the moving mechanism 307 then moves the shaft pressing member 201 further toward the rotor core 11 (i.e., in the direction Z2), so that the shaft pressing member 201 comes into abutment with the step portion 133 of the shaft 13. In this case, the rods 308b of the air cylinders 308 are pushed into the cylinder tubes 308a by the core pressing member 202 (or the core pressing member side shafts 202f), thus causing the air cylinders 308 to contract.

Figure 21:
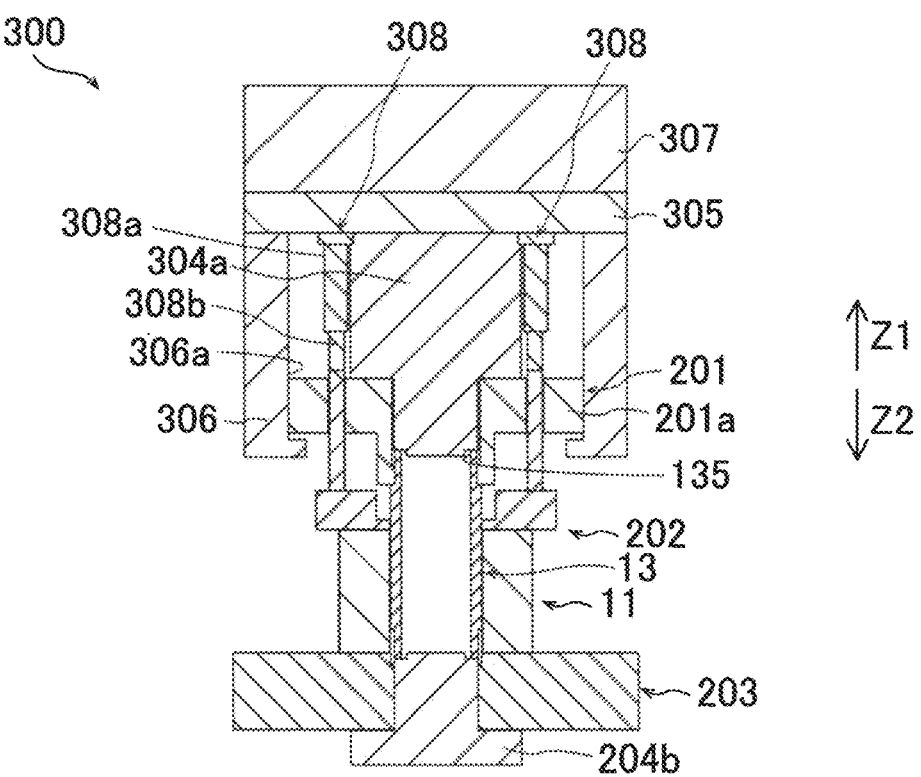
FIG. 21 is a cross-sectional view illustrating a state where an upper seal member according to the second embodiment is in abutment with the shaft pressing member.

As illustrated in FIG. 21, the moving mechanism 307 then moves the upper seal member 304a until the upper seal member 304a comes into abutment with the shaft pressing member 201 (or the shaft pressing member body 201a). In this case, the guide 306 is moved to the second side in the central axis direction (i.e., moved in the direction Z2) by the moving mechanism 307, so that the shaft pressing member 201 (or the shaft pressing member body 201a) slides along the inner peripheral surface 306a of the guide 306. Also in this case, the rods 308b of the air cylinders 308 are pushed further into the cylinder tubes 308a by the core pressing member 202 (or the core pressing member side shafts 202b, thus causing the air cylinders 308 to contract to a greater degree than those in the state illustrated in FIG. 20.

As a result of the movement of the upper seal member 304a, the opening 135 of the shaft 13 located on the first side in the central axis direction (i.e., located in the direction Z1) is closed by the upper seal member 304a.

Figure 22:
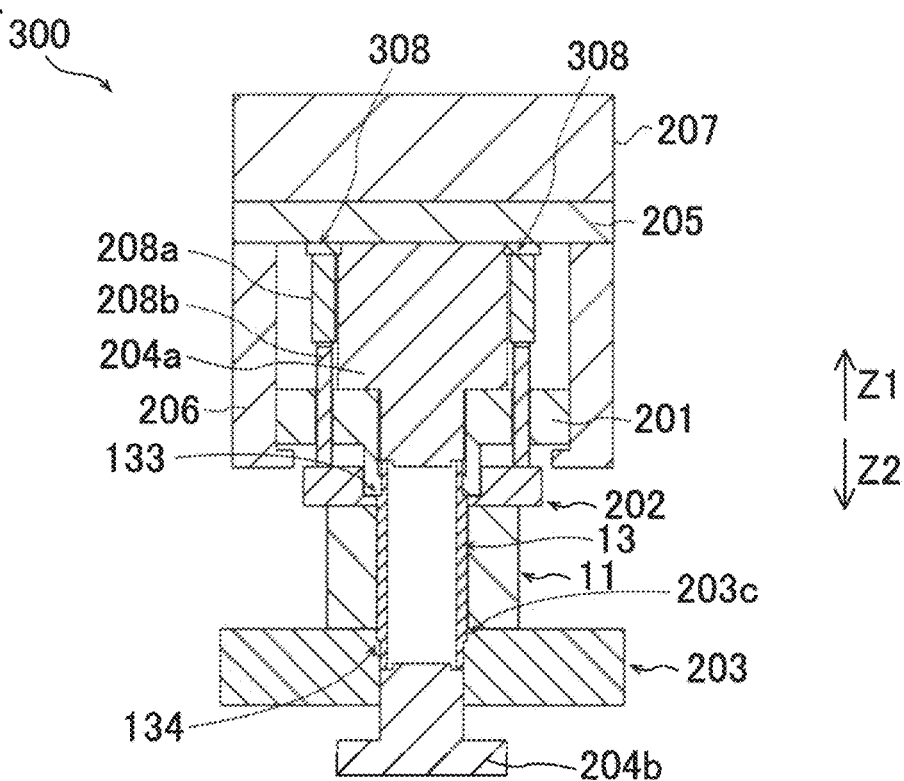
FIG. 22 is a cross-sectional view illustrating a state where the shaft according to the second embodiment is in abutment with the fixing base.

As illustrated in FIG. 22, the moving mechanism 307 then moves the upper seal member 304a, the shaft pressing member 201, and the shaft 13 together to the second side in the central axis direction (i.e., in the direction Z2) until a step portion 134 of the shaft 13 comes into abutment with a step portion 203c of the fixing base 203. In this case, the rods 308b of the air cylinders 308 are pushed further into the cylinder tubes 308a by the core pressing member 202 (or the core pressing member side shafts 202b, thus causing the air cylinders 308 to contract to a greater degree than those in the state illustrated in FIG. 21.

Thus, the step portion 133 of the shaft 13 is pressed by the moving mechanism 307 through the shaft pressing member 201, and the end face 11a of the rotor core 11 is pressed with the pressing force of the air cylinders 308 through the core pressing member 202. As used herein, the term "pressing force of the air cylinders 308" refers to a force by which the rods 308b are pressed with pressure of air inside the cylinder tubes 308a of the air cylinders 308 in a contracted state.

Figure 23:
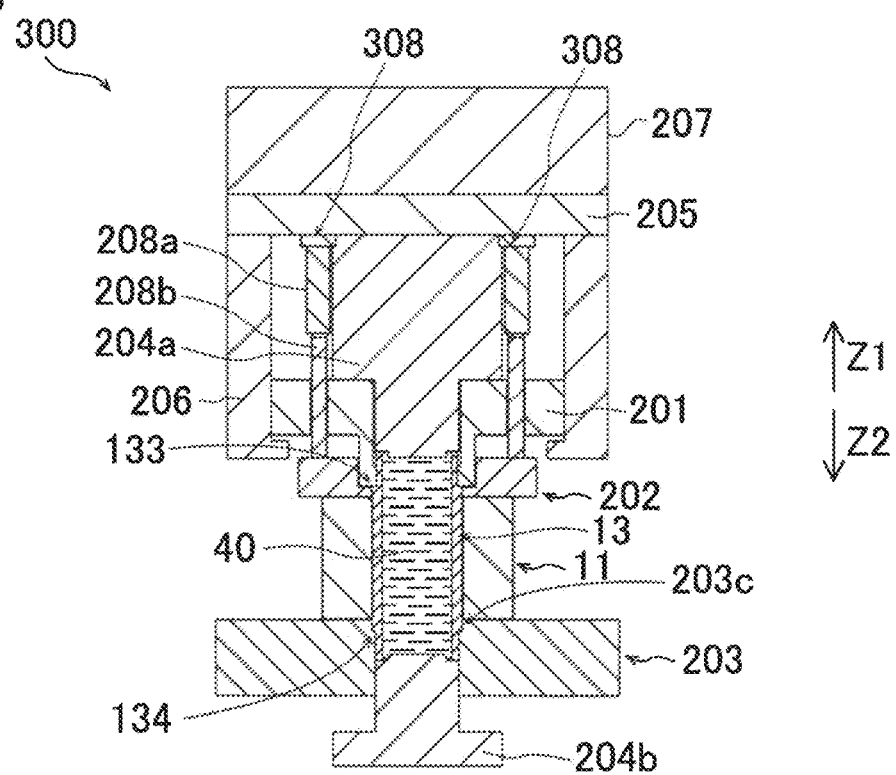
FIG. 23 is a cross-sectional view illustrating a state where a fluid is introduced into the shaft according to the second embodiment.

As illustrated in FIG. 23, the second embodiment involves, with the shaft 13 and the rotor core 11 pressed, filling the fluid 40 into the shaft 13 and pressurizing the fluid 40 (i.e., performing hydroforming), thus fixing the shaft 13 to the rotor core 11.

Other features of the second embodiment are similar to those of the first embodiment described above.

Third Embodiment

Referring to FIG. 2 and FIGS. 24 to 33, a method for manufacturing a rotor 10 according to a third embodiment and a manufacturing apparatus 400 for the rotor will be described below. Unlike the first embodiment involving using cylinders (i.e., the hydraulic cylinders 208), the method for manufacturing the rotor 10 according to the third embodiment and the manufacturing apparatus 400 for the rotor 10 involve using a spring member 408. Components similar to those in the first embodiment are illustrated with the same reference signs as those used in the first embodiment and will thus not be described.

Structure of Rotor Manufacturing Apparatus

Figure 24:
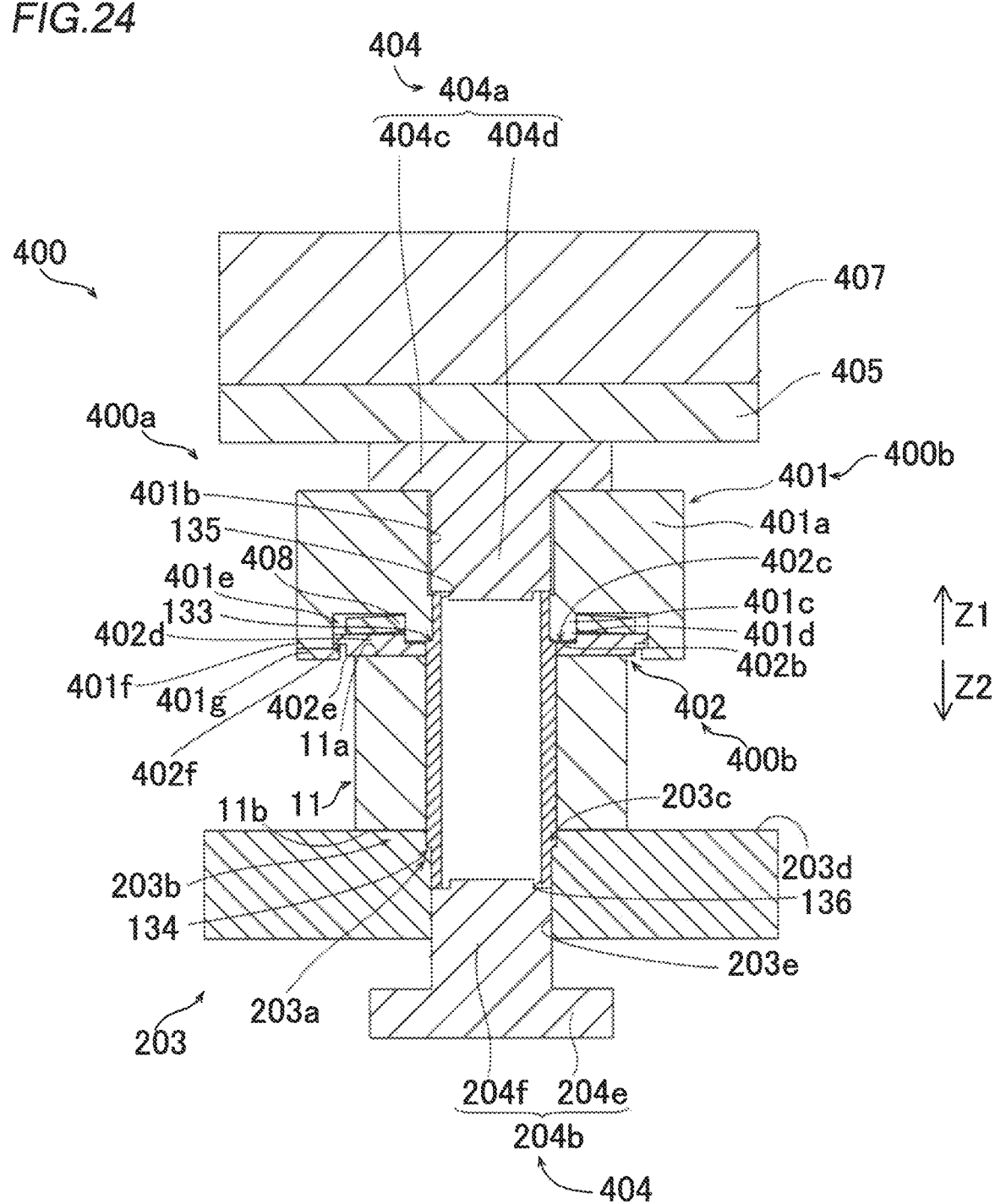
FIG. 24 is a cross-sectional view of a rotor manufacturing apparatus according to the third embodiment.

As illustrated in FIG. 24, the manufacturing apparatus 400 for the rotor includes a hydroforming die 400a. The hydroforming die 400a includes a die presser 400b. The manufacturing apparatus 400 (400a, 400b) for the rotor 10 includes a shaft pressing member 401 and a core pressing member 402.

The shaft pressing member 401 is structured to press a step portion 133 of a shaft 13 from a first side in a central axis direction (i.e., from a direction Z1). The shaft pressing member 401 includes a shaft pressing member body 401a having an annular shape (see FIG. 25). The shaft pressing member body 401a is centrally provided with a through hole 401b. As viewed in the central axis direction, the shaft pressing member 401 is provided to overlap with the core pressing member 402.

The shaft pressing member 401 includes a tubular presser 401c provided on the inner peripheral side of the shaft pressing member body 401a. The tubular presser 401c is provided to extend to a second side in the central axis direction (i.e., extend in a direction Z2) from the shaft pressing member body 401a. As viewed in the central axis direction (i.e., from the direction Z2), the tubular presser 401c is provided to extend along the outer peripheral edge of the through hole 401b of the shaft pressing member body 401a.

In the third embodiment, the tubular presser 401c is provided to guide a tubular portion 131 of the shaft 13 from its outer peripheral side, with an end 401d of the tubular presser 401c in abutment with the step portion 133. The end 401d of the tubular presser 401c is located on the second side in the central axis direction (i.e., located in the direction Z2). Specifically, the tubular presser 401c is disposed such that the tubular presser 401c is interposed between the tubular portion 131 (see FIG. 2) of the shaft 13 and an upper portion 402d (which will be described below) of the core pressing member 402, with the end 401d of the tubular presser 401c in abutment with the step portion 133.

The shaft pressing member 401 includes a recess 401e provided on the second side in the central axis direction. The recess 401e has an annular shape (see FIG. 25). Specifically, the recess 401e is provided to surround the tubular presser 401c.

The shaft pressing member 401 includes an outer peripheral portion 401f provided to surround the recess 401e. An end of the outer peripheral portion 401f located on the second side in the central axis direction (i.e., located in the direction Z2) is provided with a shaft pressing member side engagement portion 401g. The shaft pressing member side engagement portion 401g is provided to come into engagement with the upper portion 402d (which will be described below) of the core pressing member 402. The shaft pressing member side engagement portion 401g is provided such that its inner peripheral end protrudes to the recess 401e. The outer peripheral portion 401f and the shaft pressing member side engagement portion 401g each have an annular shape (see FIG. 25).

Figure 26:
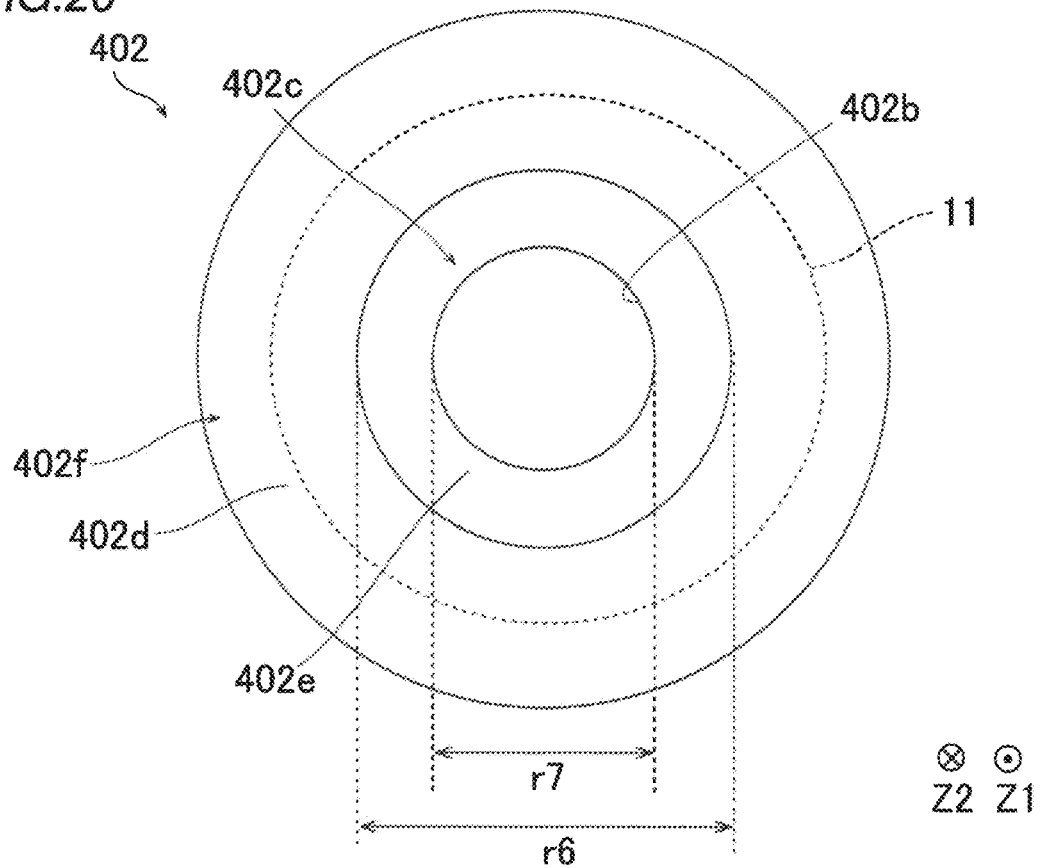
FIG. 26 is a plan view of a core pressing member according to the third embodiment.
Figure 27:
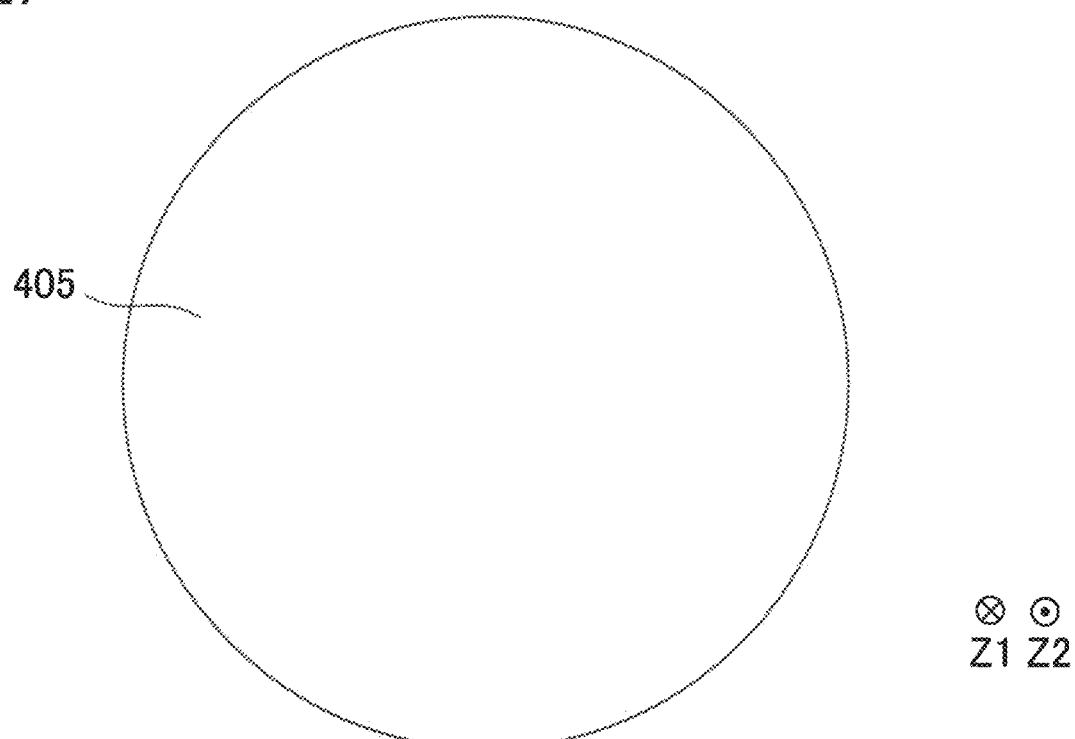
FIG. 27 is a plan view of a plate according to the third embodiment.
Figure 28:
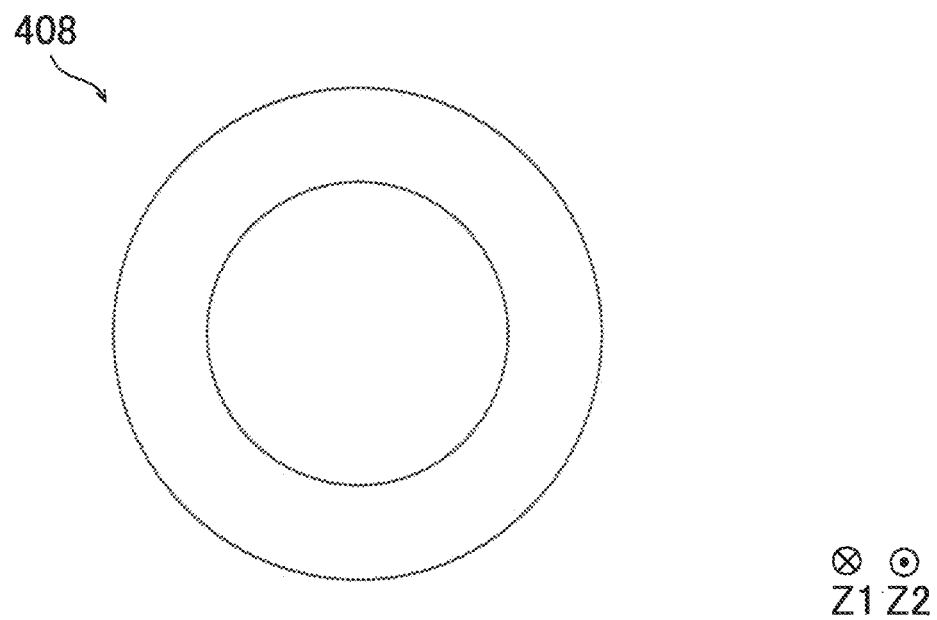
FIG. 28 is a plan view of a spring member according to the third embodiment.

The core pressing member 402 has an annular shape (see FIG. 26). Specifically, the core pressing member 402 is centrally provided with a through hole 402b.

The core pressing member 402 is provided with a step portion 402c. The core pressing member 402 includes: the upper portion 402d located on the first side in the central axis direction (i.e., located in the direction Z1) relative to the step portion 402c; and a lower portion 402e located on the second side in the central axis direction (i.e., located in the direction Z2) relative to the step portion 402c. A diameter r6 (see FIG. 26) of a portion of the through hole 402b defined in the upper portion 402d is larger than a diameter r7 (see FIG. 26) of a portion of the through hole 402b defined in the lower portion 402e.

The outer peripheral edge of the upper portion 402d of the core pressing member 402 has an annular shape (see FIG. 26) and is provided with a core pressing member side engagement portion 402f that comes into engagement with the shaft pressing member side engagement portion 401g. Because the shaft pressing member side engagement portion 401g and the core pressing member side engagement portion 402f come into engagement with each other, the core pressing member 402 is provided to be brought into engagement with the recess 401e.

The upper portion 402d of the core pressing member 402 is provided to guide the tubular presser 401c of the shaft pressing member 401 from its outer peripheral side. The lower portion 402e of the core pressing member 402 is provided to guide a portion of the shaft 13 adjacent to an end of a tubular portion 130 (see FIG. 2) located on the first side in the central axis direction (i.e., an end of the tubular portion 130 located in the direction Z1) from its outer peripheral side.

In the third embodiment, the manufacturing apparatus 400 (which includes the die 400a) for the rotor 10 includes a hydroformer 404 to perform hydroforming. Specifically, the hydroformer 404 includes an upper seal member 404a and a lower seal member 204b.

To be more specific, an opening 135 of the shaft 13 located on the first side in the central axis direction (i.e., located in the direction Z1) is closed by the upper seal member 404a, and an opening 136 of the shaft 13 located on the second side in the central axis direction (i.e., located in the direction Z2) is closed by the lower seal member 204b. In this state, a fluid 40 is filled into the shaft 13 through a fluid introducing path (not illustrated) defined in the upper seal member 404a or the lower seal member 204b. Pressurizing the fluid 40 inside the shaft 13 causes the shaft 13 to expand, so that the tubular portion 130 (see FIG. 2) is pressure-welded to an inner peripheral surface 110a (see FIG. 2) of a shaft insertion hole 110.

The upper seal member 404a includes: an upper seat 404c provided on the first side in the central axis direction; and an upper column 404d extending to the second side in the central axis direction (i.e., extending in the direction Z2) from the upper seat 404c. The upper column 404d is provided to be inserted into the through hole 401b of the shaft pressing member 401. The upper seal member 404a is provided such that the upper column 404d located inside the through hole 401b of the shaft pressing member 401 closes the opening 135 of the shaft 13.

The manufacturing apparatus 400 (which includes the die 400a) for the rotor 10 includes a plate 405 provided such that the plate 405 is interposed between a moving mechanism 407 (which will be described below) and the upper seal member 404a (or the upper seat 404c). The plate 405 has a disk shape (see FIG. 27).

The third embodiment involves providing the spring member 408 clamped between the recess 401e of the shaft pressing member 401 and the core pressing member 402.

Figure 25:
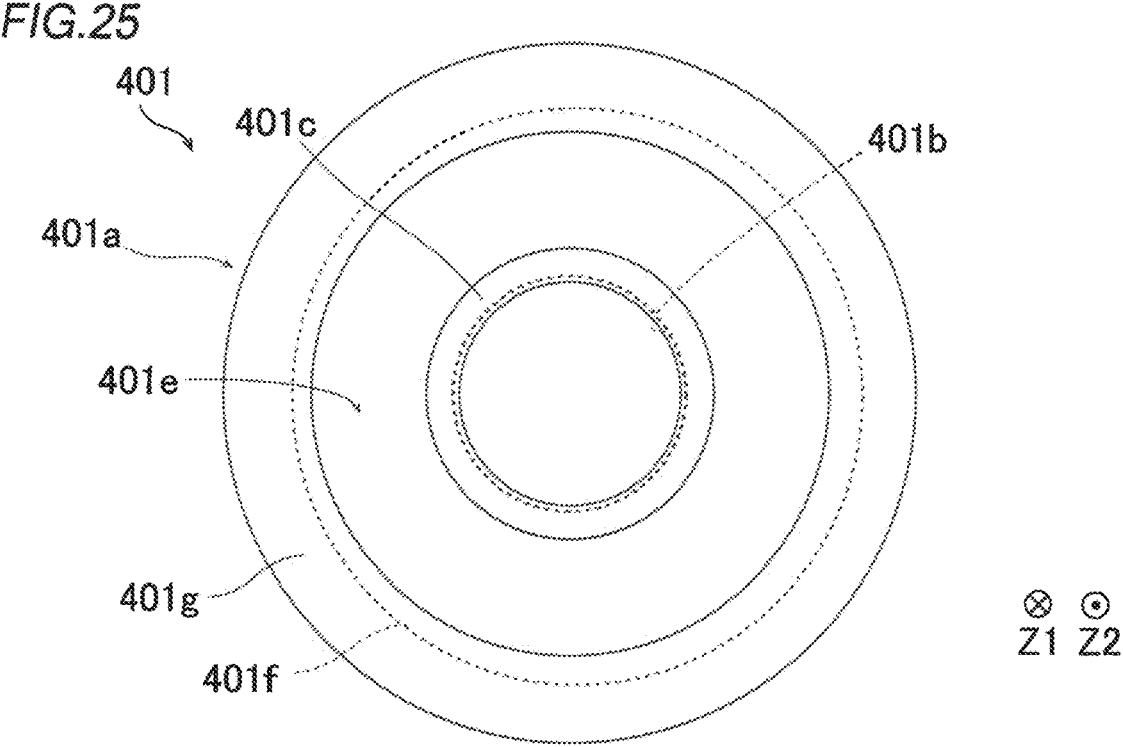
FIG. 25 is a plan view of a shaft pressing member according to the third embodiment.

The spring member 408 is disposed inside the recess 401e having an annular shape (see FIG. 25). The spring member 408 has an annular shape (see FIG. 28). The spring member 408 is an example of an "urging member" and an example of the "extensible and contractible member" in the claims.

Rotor Manufacturing Method

Referring to FIGS. 29 to 33, the method for manufacturing the rotor 10 will be described below.

Figure 29:
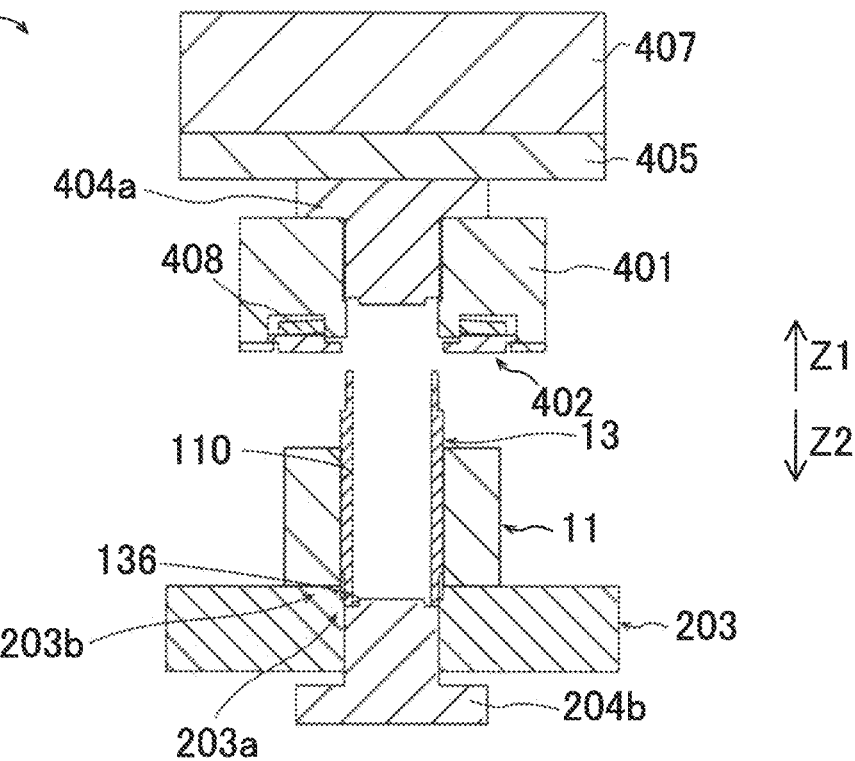
FIG. 29 is a cross-sectional view illustrating a state where the rotor core according to the third embodiment is placed on a fixing base.

First, a rotor core 11 is placed on a fixing base 203 (or its rotor core fixer 203b) as illustrated in FIG. 29. Thus, the rotor core 11 is fixed from the second side in the central axis direction (i.e., from the direction Z2).

The opening 136 of the shaft 13 located on the second side in the central axis direction (i.e., located in the direction Z2) is closed by the lower seal member 204b.

The tubular portion 130 (see FIG. 2) of the shaft 13 is inserted into the shaft insertion hole 110 of the rotor core 11. At this point, a portion of the shaft 13 located on the second side in the central axis direction is inserted into the shaft insertion hole 110 of the rotor core 11. At this point, the shaft 13 is not yet fixed by the fixing base 203 (or its shaft fixer 203a).

Figure 30:
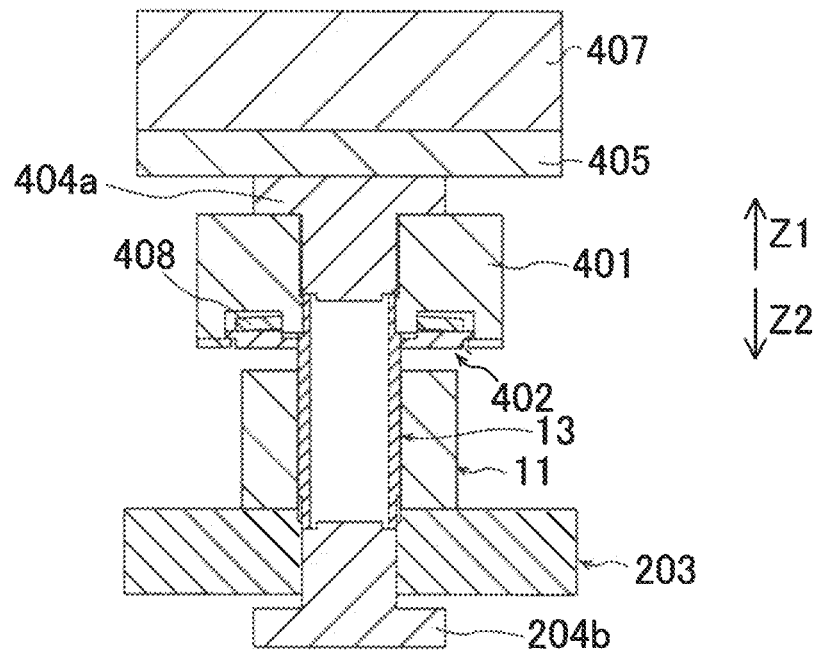
FIG. 30 is a cross-sectional view illustrating a state where the shaft pressing member according to the third embodiment is in abutment with a step portion of the shaft.

As illustrated in FIG. 30, the moving mechanism 407 then moves the shaft pressing member 401 and the core pressing member 402 together toward the rotor core 11 (i.e., in the direction Z2), thus bringing the shaft pressing member 401 into abutment with an end face 11a of the rotor core 11.

Figure 31:
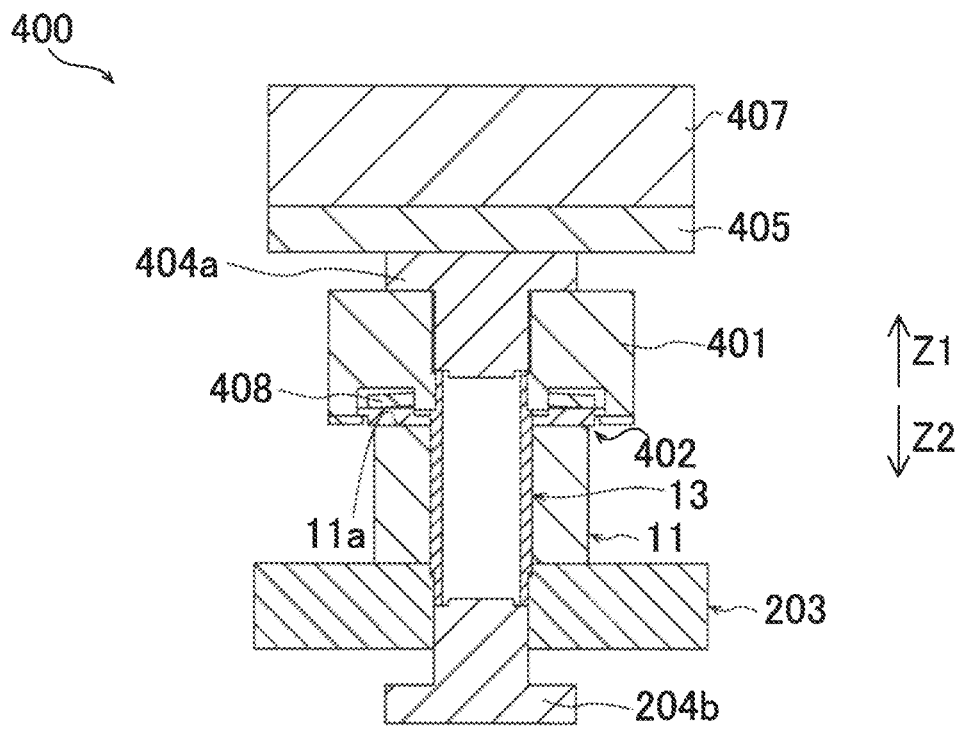
FIG. 31 is a cross-sectional view illustrating a state where the core pressing member according to the third embodiment is in abutment with the rotor core.

As illustrated in FIG. 31, the moving mechanism 407 then moves the shaft pressing member 401, the core pressing member 402, and the shaft 13 together until the core pressing member 402 comes into abutment with the end face 11a of the rotor core 11.

Figure 32:
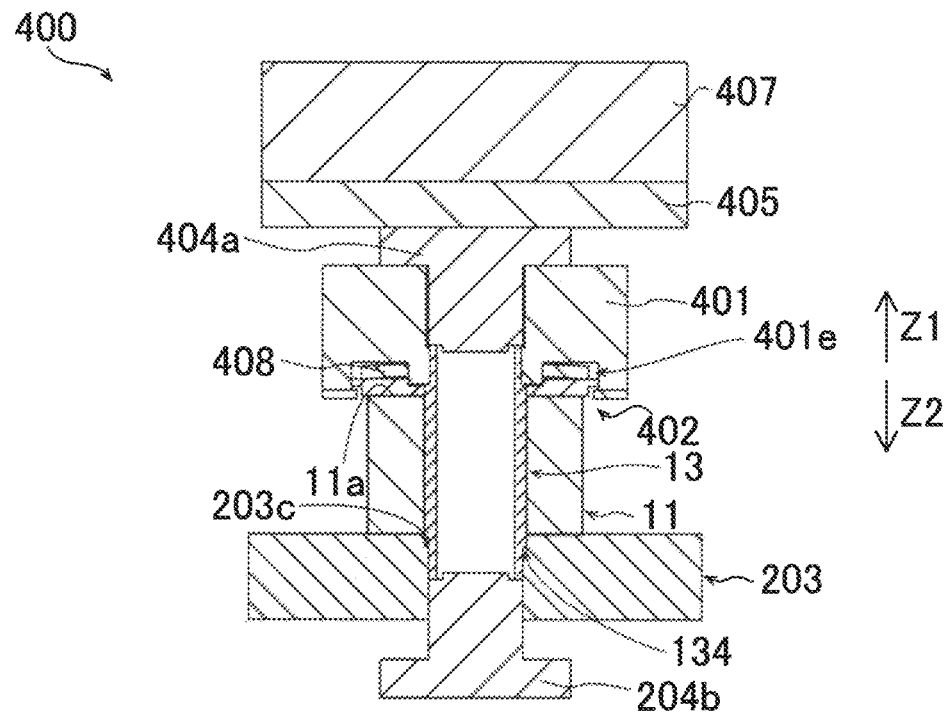
FIG. 32 is a cross-sectional view illustrating a state where the shaft according to the third embodiment is in abutment with the fixing base.

As illustrated in FIG. 32, the shaft pressing member 401 and the shaft 13 are then moved together until a step portion 134 of the shaft 13 comes into abutment with a step portion 203c of the fixing base 203. In this case, the spring member 408 is gradually contracted by being caught between the core pressing member 402 (which is in abutment with the end face 11a of the rotor core 11) and the recess 401e of the shaft pressing member 401.

Thus, the step portion 133 of the shaft 13 is pressed by the moving mechanism 407 through the shaft pressing member 401, and the end face 11a of the rotor core 11 is pressed with the pressing force of the spring member 408 through the core pressing member 402.

In the third embodiment, pressing the end face 11a of the rotor core 11 with the pressing force of the spring member 408 through the core pressing member 402 involves pressing, through the core pressing member 402, the end face 11a of the rotor core 11 with the pressing force of the spring member 408 clamped between the recess 401e of the shaft pressing member 401 and the core pressing member 402. Accordingly, only an urging force exerted by the spring member 408 (which is contracted between the recess 401e and the core pressing member 402) and independent of a pressing force exerted by the moving mechanism 407 is applied to the end face 11a of the rotor core 11.

Figure 33:
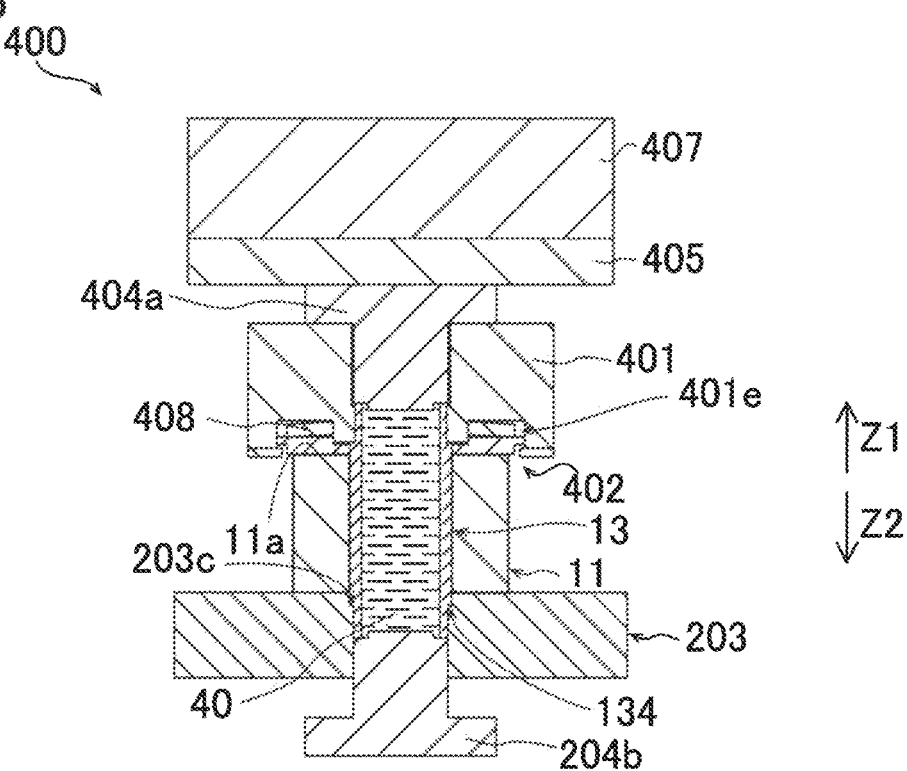
FIG. 33 is a cross-sectional view illustrating a state where a fluid is introduced into the shaft according to the third embodiment.

As illustrated in FIG. 33, the shaft 13 is fixed to the rotor core 11 by performing, with the shaft 13 and the rotor core 11 pressed, hydroforming that involves filling the fluid 40 into the shaft 13 and pressurizing the fluid 40 so as to expand the shaft 13, thus pressure-welding the tubular portion 130 (see FIG. 2) to the inner peripheral surface 110a of the shaft insertion hole 110.

Other features of the third embodiment are similar to those of the first embodiment described above.

Effects of Embodiments

The first to third embodiments described above are able to achieve effects described below.

Effects of Coil Manufacturing Method

In the first to third embodiments, a method for manufacturing a rotor (10) includes, as described above, the step of pressing a rotor core (11) in a central axis direction of the rotor core (11) by using a core pressing member (202, 402). The method for manufacturing the rotor (10) includes the step of fixing a shaft (13) to the rotor core (11) by performing, with the rotor core (11) pressed, hydroforming that involves filling a fluid (40) into the shaft (13) and pressurizing the fluid (40) so as to expand the shaft (13), thus pressure-welding the shaft (13) to an inner peripheral surface (110a) of a shaft insertion hole (110). This makes it possible to perform hydroforming, with the rotor core (11) pressed by the core pressing member (202, 402). Thus, hydroforming is performable, with the core pressing member (202, 402) preventing gaps from being created between electromagnetic steel sheets (12) that are components of the rotor core (11). Accordingly, hydroforming is performable, with a thickness (t) of the rotor core (11) falling within a certain range (i.e., within tolerance limits). Consequently, the method is able to prevent variations in the relative positional relationship between the shaft (13) and the rotor core (11) (which may occur between products).

In the first to third embodiments, the step of inserting the shaft (13) involves, as described above, inserting a first tubular portion (130) of the shaft (13) into the shaft insertion hole (110). The step of pressing the rotor core (11) involves: pressing, from a first side in the central axis direction, a step portion (133) by using a shaft pressing member (201, 401), the step portion (133) defining a boundary between the first tubular portion (130) of the shaft (13) and a second tubular portion (131) of the shaft (13), the second tubular portion (131) being disposed on the first side in the central axis direction relative to the first tubular portion (130) and having a diameter (r2) smaller than a diameter of the first tubular portion (130); and pressing, from the first side in the central axis direction, an end face (11a) of the rotor core (11) on the first side in the central axis direction by using the core pressing member (202, 402). The step of fixing the shaft (13) to the rotor core (11) involves fixing the shaft (13) to the rotor core (11) by performing, with the rotor core (11) and the shaft (13) pressed, hydroforming that involves pressure-welding the first tubular portion (130) to the inner peripheral surface (110a) of the shaft insertion hole (110). Such embodiments make it possible to prevent, with the core pressing member (202, 402), gaps from being created between the electromagnetic steel sheets (12) of the rotor core (11) while restricting movement of the shaft (13) in the central axis direction by pressing the step portion (133) with the shaft pressing member (201, 401).

In the first to third embodiments, the step of pressing the end face (11a) of the rotor core (11) by using the core pressing member (202, 402) involves, as described above, pressing the end face (11a) of the rotor core (11) by using the core pressing member (202, 402) operable independently of the shaft pressing member (201, 401). Such embodiments make it possible to more reliably press the end face (11a) of the rotor core (11) by using the core pressing member (202, 402) while pressing the step portion (133) by using the shaft pressing member (201, 401).

In the first to third embodiments, the step of pressing the shaft (13) and the rotor core (11) involves, as described above, pressing the step portion (133) from the first side in the central axis direction by using the shaft pressing member (201, 401), and pressing the end face (11a) from the first side in the central axis direction by using the core pressing member (202, 402), thus effecting positioning of the shaft (13) and the rotor core (11) relative to each other. Such embodiments make it possible to more reliably prevent variations in the relative positional relationship between the shaft (13) and the rotor core (11).

In the first to third embodiments, pressing the step portion (133) of the shaft (13) by using the shaft pressing member (201, 401) involves, as described above, pressing the step portion (133) by using the shaft pressing member (201, 401), the step portion (133) serving as a bearing placement portion on which a bearing (14) for the shaft (13) is to be placed. In such embodiments, the position of the step portion (133), which serves as the bearing placement portion, in the central axis direction is fixable by pressing the step portion (133). This makes it possible to prevent variations in the relative positional relationship between the end face (11a) of the rotor core (11) and the bearing placement portion (which may occur between products). If the end face (11a) of the rotor core (11) and the bearing placement portion are relatively close to each other, deformation of the shaft (13) (or the first tubular portion (130)) during hydroforming may result in deformation of the bearing placement portion. The deformation of the bearing placement portion relatively greatly affects operations (e.g., rotation) of the shaft (13) (or the rotor core (11)). Accordingly, such embodiments are able to prevent variations in the relative positional relationship between the end face (11a) of the rotor core (11) and the bearing placement portion.

In the first to third embodiments, the step of pressing the shaft (13) and the rotor core (11) involves, as described above, pressing the step portion (133) by using the shaft pressing member (201, 401) so as to press the shaft (13) against a shaft fixer (203a) disposed on a second side in the central axis direction relative to the shaft (13), and pressing the end face (11a) of the rotor core (11) on the first side in the central axis direction by using the core pressing member (202, 402) so as to press the rotor core (11) against a rotor core fixer (203b) disposed on the second side in the central axis direction relative to the core pressing member (202, 402), thus effecting positioning of the rotor core (11) relative to the shaft (13). In such embodiments, the rotor core (11) and the shaft (13) are each fixed on the second side in the central axis direction, making it possible to more easily prevent variations in the relative positional relationship between the end face (11a) of the rotor core (11) and the step portion (133).

In the first to third embodiments, the step of pressing the shaft (13) and the rotor core (11) involves, as described above, pressing the step portion (133) by using the shaft pressing member (201, 401) included in a hydroforming die (200a, 300a, 400a), and pressing the end face (11a) of the rotor core (11) by using the core pressing member (202, 402) included in the die (200a, 300a, 400a). Because the shaft pressing member (201, 401) and the core pressing member (202, 402) are included in the hydroforming die (200a, 300a, 400a), such embodiments enable the state of the step portion (133) pressed by the shaft pressing member (201, 401) and the state of the end face (11a) pressed by the core pressing member (202, 402) to be kept relatively constant between products (i.e., between the rotors (10)). Consequently, such embodiments are able to easily prevent variations in the relative positional relationship between the shaft (13) and the rotor core (11).

In the first to third embodiments, the step of pressing the shaft (13) and the rotor core (11) involves, as described above, moving the shaft pressing member (201, 401) and the core pressing member (202, 402) together toward the rotor core (11) by using a moving mechanism (207, 307, 407), thus pressing the step portion (133) by using the shaft pressing member (201, 401) and pressing, through the core pressing member (202, 402), the end face (11a) of the rotor core (11) by using an extensible and contractible member (208, 308, 408) provided between the moving mechanism (207, 307, 407) and the core pressing member (202, 402). In such embodiments, extending and contracting the extensible and contractible member (208, 308, 408) makes it possible to easily adjust the relative positional relationship between the shaft pressing member (201, 401) and the core pressing member (202, 402). Consequently, such embodiments are able to facilitate both pressing the end face (11a) of the rotor core (11) by using the core pressing member (202, 402) and pressing the step portion (133) by using the shaft pressing member (201, 401). Moving the shaft pressing member (201, 401) and the core pressing member (202, 402) together by using the moving mechanism (207, 307, 407) makes it possible to bring the shaft pressing member (201, 401) and the core pressing member (202, 402) closer to the rotor core (11) while maintaining the relative positional relationship between the shaft pressing member (201, 401) and the core pressing member (202, 402) constant.

In the first and second embodiments, the step of pressing the shaft (13) and the rotor core (11) involves, as described above, moving the shaft pressing member (201) and the core pressing member (202) together toward the rotor core (11) by using the moving mechanism (207, 307) until the core pressing member (202) comes into abutment with the end face (11a) of the rotor core (11), and then moving the shaft pressing member (201) further toward the rotor core (11) so as to press the shaft pressing member (201) into abutment with the step portion (133) and press the end face (11a) of the rotor core (11) with a pressing force of the extensible and contractible member (208, 308) through the core pressing member (202). If the shaft pressing member (201) is brought into abutment with the step portion (133) and then the core pressing member (202) is brought into abutment with the end face (11a), interference of the shaft pressing member (201) and the step portion (133) may prevent the core pressing member (202) from reaching the end face (11a). In contrast, when the core pressing member (202) is brought into abutment with the end face (11a) and then the shaft pressing member (201) is brought into abutment with the step portion (133) as described above, moving the shaft pressing member (201) while contracting the extensible and contractible member (208, 308) makes it possible to bring the shaft pressing member (201) into abutment with the step portion (133). Consequently, such embodiments are able to further facilitate both pressing exerted by the shaft pressing member (201) and pressing exerted by the core pressing member (202).

In the first embodiment, pressing the end face (11a) of the rotor core (11) with a pressing force of the extensible and contractible member (208) through the core pressing member (202) involves, as described above, driving a first cylinder member (208) serving as the extensible and contractible member (208) with hydraulic pressure supplied from outside the moving mechanism (207), thus pressing the end face (11a) of the rotor core (11) through the core pressing member (202). In such an embodiment, adjusting the hydraulic pressure for driving the first cylinder member (208) makes it possible to easily adjust a force for pressing the end face (11a) of the rotor core (11).

In the second embodiment, pressing the end face (11a) of the rotor core (11) with a pressing force of the extensible and contractible member (308) through the core pressing member (202) involves, as described above, pressing, through the core pressing member (202), the end face (11a) of the rotor core (11) with a pressing force of a second cylinder member (308) clamped between the moving mechanism (307) and the core pressing member (202), the second cylinder member (308) being elastically extensible and contractible. Such an embodiment is able to press the end face (11a) of the rotor core (11) with an elastic force of the second cylinder member (308) in a contracted state.

In the third embodiment, pressing the end face (11a) of the rotor core (11) with a pressing force of the extensible and contractible member (408) through the core pressing member (402) involves, as described above, pressing, through the core pressing member (402), the end face (11a) of the rotor core (11) with a pressing force of an urging member (408) clamped between a recess (401e) of the shaft pressing member (401) and the core pressing member (402). Such an embodiment is able to press the end face (11a) of the rotor core (11) with an urging force (or an elastic force) of the urging member (408) in a contracted state.

Effects of Rotor Manufacturing Apparatus

In the first to third embodiments, a manufacturing apparatus (200, 300, 400) for a rotor (10) includes, as described above, a die presser (200b, 400b) including a core pressing member (202, 402) to press a rotor core (11) in a central axis direction of the rotor core (11). The manufacturing apparatus (200, 300, 400) for the rotor (10) includes a hydroformer (204, 304, 404) to perform, with the rotor core (11) pressed, hydroforming that involves filling a fluid (40) into a shaft (13) and pressurizing the fluid (40) so as to expand the shaft (13), thus pressure-welding the shaft (13) to an inner peripheral surface (110a) of a shaft insertion hole (110). This makes it possible to perform hydroforming, with the rotor core (11) pressed by the core pressing member (202, 402). Thus, hydroforming is performable, with the core pressing member (202, 402) preventing gaps from being created between electromagnetic steel sheets (12) that are components of the rotor core (11). Accordingly, hydroforming is performable, with a thickness (t) of the rotor core (11) falling within a certain range (i.e., within tolerance limits). Consequently, the first to third embodiments are able to provide the manufacturing apparatus (200, 300, 400) for the rotor (10), which is capable of preventing variations in the relative positional relationship between the shaft (13) and the rotor core (11) (which may occur between products).

In the first to third embodiments, the die presser (200b, 400b) further includes, as described above, a shaft pressing member (201, 401) to press, from a first side in the central axis direction, a step portion (133) defining a boundary between a first tubular portion (130) of the shaft (13) and a second tubular portion (131) of the shaft (13), the second tubular portion (131) being disposed on the first side in the central axis direction relative to the first tubular portion (130) and having a diameter (r2) smaller than a diameter of the first tubular portion (130). The core pressing member (202, 402) is structured to press, from the first side in the central axis direction, an end face (11a) of the rotor core (11) located on the first side in the central axis direction. The hydroformer (204, 304, 404) is provided to perform, with the rotor core (11) and the shaft (13) pressed, hydroforming that involves pressure-welding the first tubular portion (130) to the inner peripheral surface (110a) of the shaft insertion hole (110). Such embodiments are able to provide the manufacturing apparatus (200, 300, 400) for the rotor (10), which is capable of preventing, with the core pressing member (202, 402), gaps from being created between the electromagnetic steel sheets (12) of the rotor core (11) while restricting movement of the shaft (13) in the central axis direction by pressing the step portion (133) with the shaft pressing member (201, 401).

In the first to third embodiments, the core pressing member (202, 402) is structured to be operable independently of the shaft pressing member (201, 401) as described above. Such embodiments make it possible to provide the manufacturing apparatus (200, 300, 400) for the rotor (10), which is capable of more reliably pressing the end face (11a) of the rotor core (11) by using the core pressing member (202, 402) while pressing the step portion (133) by using the shaft pressing member (201, 401).

In the first to third embodiments, the shaft pressing member (201, 401) includes, as described above, a shaft pressing member body (201a, 401a) having an annular shape and a tubular presser (201c, 401c) disposed on an inner peripheral side of the shaft pressing member body (201a, 401a) and provided to extend to a second side in the central axis direction from the shaft pressing member body (201a, 401a). The tubular presser (201c, 401c) is provided to guide the second tubular portion (131) of the shaft (13) from its outer peripheral side, with an end (201d, 401d) of the tubular presser (201c, 401c) on the second side in the central axis direction in abutment with the step portion (133). Such embodiments are able to prevent deformation of the second tubular portion (131) (and the step portion (133)) during hydroforming by guiding the second tubular portion (131) from its outer peripheral side using the tubular presser (201c, 401c) while fixing the position of the shaft (13) in the central axis direction by pressing the step portion (133) of the shaft (13) using the tubular presser (201c, 401c).

In the first to third embodiments, the manufacturing apparatus (200, 300, 400) for the rotor (10) includes, as described above, a fixing base (203) that includes: a shaft fixer (203a) disposed on a second side in the central axis direction relative to the shaft (13), the shaft fixer (203a) fixing the shaft from the second side in the central axis direction; and a rotor core fixer (203b) disposed on the second side in the central axis direction relative to the core pressing member (202, 402), the rotor core fixer (203b) fixing the rotor core (11) from the second side in the central axis direction. Such embodiments are able to provide the manufacturing apparatus (200, 300, 400) for the rotor (10), which is capable of more easily preventing variations in the relative positional relationship between the end face (11a) of the rotor core (11) and the step portion (133) by fixing each of the rotor core (11) and the shaft (13) on the second side in the central axis direction.

In the first to third embodiments, the manufacturing apparatus (200, 300, 400) for the rotor (10) includes, as described above, a moving mechanism (207, 307, 407) to move the shaft pressing member (201, 401) and the core pressing member (202, 402) together toward the rotor core (11), and an extensible and contractible member (208, 308, 408) provided between the moving mechanism (207, 307, 407) and the core pressing member (202, 402), the extensible and contractible member (208, 308, 408) being structured to be extensible and contractible in the central axis direction. The moving mechanism (207, 307, 407) is structured to press the step portion (133) through the shaft pressing member (201, 401). The extensible and contractible member (208, 308, 408) is structured to press the end face (11*a*) of the rotor core (11) through the core pressing member (202, 402). In such embodiments, extending and contracting the extensible and contractible member (208, 308, 408) makes it possible to easily adjust the relative positional relationship between the shaft pressing member (201, 401) and the core pressing member (202, 402). Consequently, such embodiments are able to provide the manufacturing apparatus (200, 300, 400) for the rotor (10), which is capable of facilitating both pressing the end face (11*a*) of the rotor core (11) by using the core pressing member (202, 402) and pressing the step portion (133) by using the shaft pressing member (201, 401).

In the third embodiment, the shaft pressing member (401) includes, as described above, a recess (401*e*) provided on the second side in the central axis direction. The core pressing member (402) is provided to be brought into engagement with the recess (401*e*). The extensible and contractible member (408) includes an urging member (408) clamped between the recess (401*e*) of the shaft pressing member (401) and the core pressing member (402). Such an embodiment is able to provide the manufacturing apparatus (400) for the rotor (10), which is capable of pressing the end face (11*a*) of the rotor core (11) with an urging force (or an elastic force) of the urging member (408) contracted between the recess (401*e*) and the core pressing member (402).

In the first embodiment, the extensible and contractible member (208) includes, as described above, a first cylinder member (208) to be driven by hydraulic pressure supplied from outside the moving mechanism (207). Such an embodiment is able to provide the manufacturing apparatus (200) for the rotor (10), which is capable of easily adjusting a force for pressing the end face (11*a*) of the rotor core (11) by adjusting the hydraulic pressure for driving the first cylinder member (208).

In the second embodiment, the extensible and contractible member (308) includes, as described above, a second cylinder member (308) clamped between the moving mechanism (307) and the core pressing member (202), the second cylinder member (308) being elastically extensible and contractible. Such an embodiment is able to provide the manufacturing apparatus (300) for the rotor (10), which is capable of pressing the end face (11*a*) of the rotor core (11) with an elastic force of the second cylinder member (308) in a contracted state.

In the first and second embodiments, the core pressing member (202) includes, as described above, a core pressing member body (202*a*) that comes into abutment with the end face (11*a*) of the rotor core (11) and a core pressing member side shaft (202*f*) extending to the first side in the central axis direction from the core pressing member body (202*a*). The shaft pressing member (201*a*) includes a through hole (201*e*) through which the core pressing member side shaft (202*f*) passes. The shaft pressing member (201*a*) is structured to be movable independently of the core pressing member side shaft (202*f*) between the extensible and contractible member (208, 308) and the core pressing member body (202*a*), with the core pressing member side shaft (202*f*) passing through the through hole (201*e*). The extensible and contractible member (208, 308) is provided adjacent, in the central axis direction, to an end (202*g*) of the core pressing member side shaft (202*f*) protruding to the first side in the central axis direction from the through hole (201*e*) of the shaft pressing member (201*a*). In such embodiments, if the shaft pressing member (201*a*) is provided between the extensible and contractible member (208, 308) and the core pressing member body (202*a*), the extensible and contractible member (208, 308) would be able to press the core pressing member body (202*a*) (and the end face (11*a*) of the rotor core (11)) through the core pressing member side shaft (202*f*) passing through the through hole (201*e*) of the shaft pressing member (201*a*). Because the shaft pressing member (201*a*) is structured to be movable independently of the core pressing member side shaft (202*f*), with the core pressing member side shaft (202*f*) passing through the through hole (201*e*), such embodiments are able to easily press the step portion (133) of the rotor core (11) by using the shaft pressing member (201*a*) independently of pressing the core pressing member side shaft (202*f*) by using the extensible and contractible member (208, 308).

Variations

The embodiments disclosed herein are to be considered as not limitative but illustrative in all respects. The scope of the present disclosure is defined not by the description of the above embodiments but by the claims and includes all changes (or variations) falling within the meaning and range equivalent to the claims.

The above first to third embodiments, for example, have illustrated an example where the shaft pressing member (201, 401) and the core pressing member (202, 402) are moved together by the moving mechanism (207, 307, 407). The present disclosure, however, is not limited to this example. In one example, the shaft pressing member (201, 401) and the core pressing member (202, 402) may be moved independently by different moving mechanisms.

The above first to third embodiments have illustrated an example where the rotor core fixer 203*b* and the shaft fixer 203*a* are integral with each other. The present disclosure, however, is not limited to this example. The rotor core fixer and the shaft fixer may be provided separately.

The above first to third embodiments have illustrated an example where the step portion 133 of the shaft 13 is the bearing placement portion on which the bearing 14 is to be placed. The present disclosure, however, is not limited to this example. The step portion 133 of the shaft 13 may be a portion thereof other than the bearing placement portion.

The above first to third embodiments have illustrated an example where the core pressing member (202, 402) presses an entirety of the end face 11*a* of the rotor core 11. The present disclosure, however, is not limited to this example. The core pressing member (202, 402) may press only a portion of the end face 11*a* of the rotor core 11.

The above first to third embodiments have illustrated an example where the shaft pressing member (201, 401) presses an entire circumference of the step portion 133 of the shaft 13. The present disclosure, however, is not limited to this example. The shaft pressing member (201, 401) may press only a portion of the entire circumference of the step portion 133 of the shaft 13.

The above first and second embodiments have illustrated an example where the core pressing member 202 is bought into abutment with the end face 11*a* of the rotor core 11 and then the shaft pressing member 201 is brought into abutment with the step portion 133 of the shaft 13. The present disclosure, however, is not limited to this example. In one example, the shaft pressing member 201 may be brought into abutment with the step portion 133 of the shaft 13 and then the core pressing member 202 may be bought into abutment with the end face 11*a* of the rotor core 11. In another example, the shaft pressing member 201 and the core pressing member 202 may be simultaneously brought into abutment with the step portion 133 of the shaft 13 and the end face 11*a* of the rotor core 11, respectively.

The above first embodiment has illustrated an example where the hydraulic cylinders 208 (i.e., the extensible and contractible member or the first cylinder member) press the end face 11a of the rotor core 11. The present disclosure, however, is not limited to this example. Component(s) other than the hydraulic cylinders 208 (i.e., the extensible and contractible member or the first cylinder member), such as air cylinder(s) or spring member (s), may press the end face 11a of the rotor core 11. In the above second embodiment, component(s) other than the air cylinders 308 (i.e., the extensible and contractible member or the second cylinder member), such as hydraulic cylinder(s) or spring member (s), may press the end face 11a of the rotor core 11.

The above third embodiment has illustrated an example where the shaft pressing member 401 is brought into abutment with the step portion 133 of the shaft 13 and then the core pressing member 402 is brought into abutment with the end face 11a of the rotor core 11. The present disclosure, however, is not limited to this example. In one example, the core pressing member 402 may be brought into abutment with the end face 11a of the rotor core 11 and then the shaft pressing member 401 may be brought into abutment with the step portion 133 of the shaft 13. In another example, the shaft pressing member 401 and the core pressing member 402 may be simultaneously brought into abutment with the step portion 133 of the shaft 13 and the end face 11a of the rotor core 11, respectively.

The above third embodiment has illustrated an example where the spring member 408 presses the end face 11a of the rotor core 11. The present disclosure, however, is not limited to this example. Although an example of pressing the end face 11a of the rotor core 11 has been illustrated, the present disclosure is not limited to this example. In one example, cushioning other than the spring member 408 may press the end face 11a of the rotor core 11.

The above first to third embodiments have illustrated an example where the shaft pressing member (201, 401) presses the step portion 133 of the shaft 13, thus moving the shaft 13 so as to press the shaft 13 against the shaft fixer 203a. The present disclosure, however, is not limited to this example. The shaft pressing member (201, 401) may be brought into abutment with the shaft 13 fixed to the shaft fixer 203a.

The above first to third embodiments have illustrated an example where the core pressing member (202, 402) presses the rotor core 11 while the shaft pressing member (201, 401) presses the step portion 133 of the shaft 13. The present disclosure, however, is not limited to this example. An alternative example may involve pressing the rotor core 11 by using the core pressing member (202, 402) without pressing the step portion 133 of the shaft 13.

DESCRIPTION OF THE REFERENCE NUMERALS 10 rotor
11 rotor core
11a end face (end face of rotor core on first side in central axis direction)
13 shaft
14 bearing
40 fluid
110 shaft insertion hole
110a inner peripheral surface
130 tubular portion (first tubular portion)
131 tubular portion (second tubular portion)
133 step portion
200, 300, 400 manufacturing apparatus
200a, 300a, 400a die
200b, 400b die presser
201, 401 shaft pressing member
201a, 401a shaft pressing member body
201c, 401c tubular presser
201d, 401d end (end of tubular presser)
201e through hole (through hole through which core pressing member side shaft passes)
202, 402 core pressing member
202a core pressing member body
202f core pressing member side shaft
202g end (end of core pressing member side shaft)
203 fixing base
203a shaft fixer
203b rotor core fixer
204, 304, 404 hydroformer
207, 307, 407 moving mechanism
208 hydraulic cylinder (extensible and contractible member, first cylinder member)
308 air cylinder (extensible and contractible member, second cylinder member)
401e recess
408 spring member (extensible and contractible member, urging member)
r2 diameter (diameter of second tubular portion)

The invention claimed is:

1. A method for manufacturing a rotor that is operatively associated with an apparatus, the rotor includes an annular rotor core provided with a shaft insertion hole, and a tubular shaft, the rotor manufacturing method comprising steps of:
   inserting the tubular shaft into the shaft insertion hole of the rotor core;
   pressing the rotor core in a central axis direction of the rotor core by using a core pressing member of the apparatus; and
   fixing the tubular shaft to the rotor core, while the rotor core pressed by performing hydroforming, wherein the performing of hydroforming comprises filling a fluid into the tubular shaft and pressurizing the fluid so as to expand the tubular shaft, thus pressure-welding the tubular shaft to an inner peripheral surface of the shaft insertion hole.

2. The rotor manufacturing method according to claim 1, wherein
   the inserting the tubular shaft comprises inserting a first tubular portion of the tubular shaft into the shaft insertion hole,
   the pressing the rotor core by the using a shaft pressing member of the apparatus comprises pressing a step portion of the shaft from a first side in the central axis direction, the step portion defining a boundary between the first tubular portion of the tubular shaft and a second tubular portion of the tubular shaft, the second tubular portion being disposed on the first side in the central axis direction relative to the first tubular portion and having a diameter smaller than a diameter of the first tubular portion; and pressing an end face of the rotor core from the first side in the central axis direction by using the core pressing member of the apparatus, and
   the fixing the tubular shaft to the rotor core comprises fixing the tubular shaft to the rotor core by hydroforming while the rotor core and the tubular shaft are pressed, the hydroforming further comprises pressure-welding the first tubular portion to the inner peripheral surface of the shaft insertion hole.

3. The rotor manufacturing method according to claim 2, wherein the pressing the end face of the rotor core by using the core pressing member includes pressing the end face of the rotor core by using the core pressing member operable independently of the shaft pressing member.

4. The rotor manufacturing method according to claim 2, wherein the pressing the tubular shaft and the rotor core includes pressing the step portion from the first side in the central axis direction by using the shaft pressing member, and pressing the end face from the first side in the central axis direction by using the core pressing member, thus effecting positioning of the tubular shaft and the rotor core relative to each other.

5. The rotor manufacturing method according to claim 2, wherein pressing the step portion of the tubular shaft by using the shaft pressing member includes pressing the step portion by using the shaft pressing member, the step portion serving as a bearing placement portion on which a bearing for the tubular shaft is to be placed.

6. The rotor manufacturing method according to claim 2, wherein the pressing the tubular shaft and the rotor core includes pressing the step portion by using the shaft pressing member so as to press the tubular shaft against a shaft fixer disposed on a second side in the central axis direction relative to the tubular shaft, and pressing the end face of the rotor core on the first side in the central axis direction by using the core pressing member so as to press the rotor core against a rotor core fixer disposed on the second side in the central axis direction relative to the core pressing member, thus effecting positioning of the rotor core relative to the tubular shaft.

7. The rotor manufacturing method according to claim 2, wherein the pressing the tubular shaft and the rotor core includes pressing the step portion by using the shaft pressing member included in a hydroforming die, and pressing the end face of the rotor core by using the core pressing member included in the die.

8. The rotor manufacturing method according to claim 2, wherein the pressing the tubular shaft and the rotor core includes moving the shaft pressing member and the core pressing member together toward the rotor core by using a moving mechanism, thus pressing the step portion by using the shaft pressing member and pressing, through the core pressing member, the end face of the rotor core by using an extensible and contractible member provided between the moving mechanism and the core pressing member.

9. The rotor manufacturing method according to claim 8, wherein the pressing the tubular shaft and the rotor core includes moving the shaft pressing member and the core pressing member together toward the rotor core by using the moving mechanism until the core pressing member comes into abutment with the end face of the rotor core, and then moving the shaft pressing member further toward the rotor core so as to press the shaft pressing member into abutment with the step portion and press the end face of the rotor core with a pressing force of the extensible and contractible member through the core pressing member.

10. The rotor manufacturing method according to claim 8, wherein pressing the end face of the rotor core with a pressing force of the extensible and contractible member through the core pressing member includes driving a first cylinder member serving as the extensible and contractible member with hydraulic pressure supplied from outside the moving mechanism, thus pressing the end face of the rotor core through the core pressing member.

11. The rotor manufacturing method according to claim 8, wherein pressing the end face of the rotor core with a pressing force of the extensible and contractible member through the core pressing member includes pressing, through the core pressing member, the end face of the rotor core with a pressing force of a second cylinder member clamped between the moving mechanism and the core pressing member, the second cylinder member being elastically extensible and contractible.

12. The rotor manufacturing method according to claim 8, wherein pressing the end face of the rotor core with a pressing force of the extensible and contractible member through the core pressing member includes pressing, through the core pressing member, the end face of the rotor core with a pressing force of an urging member clamped between a recess of the shaft pressing member and the core pressing member.

\* \* \* \* \*